United States Patent
Kodra et al.

(10) Patent No.: US 10,488,556 B2
(45) Date of Patent: Nov. 26, 2019

(54) SYSTEM FOR MULTIVARIATE CLIMATE CHANGE FORECASTING WITH UNCERTAINTY QUANTIFICATION

(71) Applicant: Northeastern University, Boston, MA (US)

(72) Inventors: Evan Kodra, Cambridge, MA (US); Auroop R. Ganguly, Medford, MA (US)

(73) Assignee: Northeastern University, Boston, MA (US)

( * ) Notice: Subject to any disclaimer, the term of this patent is extended or adjusted under 35 U.S.C. 154(b) by 213 days.

(21) Appl. No.: 15/127,635

(22) PCT Filed: Mar. 27, 2015

(86) PCT No.: PCT/US2015/022922
§ 371 (c)(1),
(2) Date: Sep. 20, 2016

(87) PCT Pub. No.: WO2015/148887
PCT Pub. Date: Oct. 1, 2015

(65) Prior Publication Data
US 2017/0176640 A1    Jun. 22, 2017

Related U.S. Application Data

(60) Provisional application No. 61/971,932, filed on Mar. 28, 2014, provisional application No. 61/972,919, filed on Mar. 31, 2014.

(51) Int. Cl.
*G01W 1/10*    (2006.01)
*G01W 1/06*    (2006.01)
(Continued)

(52) U.S. Cl.
CPC ............. *G01W 1/10* (2013.01); *G01W 1/06* (2013.01); *G06N 7/005* (2013.01); *G06N 7/08* (2013.01)

(58) Field of Classification Search
None
See application file for complete search history.

(56) References Cited

U.S. PATENT DOCUMENTS 6,061,013 A    5/2000    Sauvageot et al.
7,249,007 B1 *  7/2007    Dutton .................... G01W 1/10
                                                          702/10

(Continued)

OTHER PUBLICATIONS

R.K. Srivastav, et al., Water Resources Research Report—Computerized Tool for the Development of Intensity-Duration-Frequency Curves under a Changing Climate—Technical Manual v.1.1, Department of Civil and Environmental Engineering, The University of Western Ontario, London, Ontario, Canada, Feb. 2015, 94 pgs.

(Continued)

*Primary Examiner* — Sujoy K Kundu
*Assistant Examiner* — Terence E Stifter, Jr.
(74) *Attorney, Agent, or Firm* — Verrill Dana, LLP

(57) ABSTRACT

A system and method for providing multivariate climate change forecasting are provided that obtain, from one or more climate model datasets, simulated historical and future climate model data, and from one or more climate observational datasets, historical observed climate data. A statistical distribution, using a Bayesian model, is provided of extremes or climate indices for one or more variable climate features using the simulated climate model data and the observed climate data. One or more metrics are determined, including a prediction of a future climate variable for a determined future time period, a confidence bound of the prediction of the future climate variable for the determined (Continued)

future time period, and a prediction bound for the future climate variable for the determined future time period. The metrics can be transmitted to a variety of applications in a variety of formats.

54 Claims, 13 Drawing Sheets

(51) Int. Cl.
*G06N 7/00* (2006.01)
*G06N 7/08* (2006.01)

(56) References Cited

U.S. PATENT DOCUMENTS

| | | | |
|---|---|---|---|
| 8,160,995 | B1 | 4/2012 | Crawford et al. |
| 8,204,846 | B1* | 6/2012 | Crawford ............... G06N 7/005 706/45 |
| 2002/0194113 | A1 | 12/2002 | Lof et al. |
| 2006/0085164 | A1* | 4/2006 | Leyton ................... G01W 1/10 702/179 |
| 2006/0271297 | A1* | 11/2006 | Repelli ................... G01W 1/00 702/3 |
| 2008/0167822 | A1 | 7/2008 | Loukos |
| 2009/0138415 | A1* | 5/2009 | Lancaster ................ G06N 5/04 706/11 |
| 2012/0221376 | A1 | 8/2012 | Austin |
| 2013/0110399 | A1* | 5/2013 | Moss ...................... G01W 1/10 702/3 |
| 2013/0231906 | A1* | 9/2013 | Luvalle ................... G01W 1/10 703/2 |
| 2014/0372039 | A1* | 12/2014 | Leblanc .................. G01W 1/10 702/3 |
| 2015/0193713 | A1* | 7/2015 | Giunta .................... G01W 1/10 705/7.25 |

OTHER PUBLICATIONS

A. Schardong, et al., Water Resources Research Report—Computerized Tool for the Development of Intensity-Duration-Frequency Curves under a Changing Climate—Users Manual v.1.1, Department of Civil and Environmental Engineering, The University of Western Ontario, London, Ontario, Canada, Feb. 2015, 70 pgs.

C. Tebaldi, et al., "Joint projections of temperature and precipitation change from multiple climate models: a hierarchical Bayesian approach", J.R. Statist. Soc. A, (2009), vol. 172, Part 1, pp. 83-106.

Ganguly, et al., "Multivariate dependence among extremes, abrupt change and anomalies iin space and time for climate applications", Workshop on "Data Mining for Anomaly Detection" in conjunction with Eleventh ACM SIGKDD International Conference on Knowledge Discovery and Data Mining, KDD ' 05, Aug. 21, 2005, Chicago, IL, pp. 25-26.

C. Huntingford, et al., "Regional climate-model predictions of extreme rainfall for a changing climate", Q. J. R. Meteorol. Soc., (2003), vol. 129, pp. 1607-1621.

* cited by examiner

SYSTEM FOR MULTIVARIATE CLIMATE CHANGE FORECASTING WITH UNCERTAINTY QUANTIFICATION

CROSS-REFERENCE TO RELATED APPLICATIONS

This application claims the benefit under 35 U.S.C. § 119(e) of U.S. Provisional Patent Application No. 61/971,932, filed Mar. 28, 2014, entitled System for Multivariate Climate Change Forecasting With Uncertainty Quantification, and U.S. Provisional Patent Application No. 61/972,919, filed Mar. 31, 2014, entitled System for Multivariate Climate Change Forecasting With Uncertainty Quantification, the disclosures of which are incorporated by reference herein in their entirety.

STATEMENT REGARDING FEDERALLY SPONSORED RESEARCH OR DEVELOPMENT

This invention was made with government support under grant No. 1029711, awarded by the National Science Foundation. The government has certain rights in the invention.

BACKGROUND

Physical theory and growing evidence suggests that under greenhouse gas driven global warming scenarios, extreme weather events will often become more intense. Heavy, regional precipitation events are among the principal weather extremes expected to evolve under warming. As the atmosphere warms, on average, atmospheric moisture holding capacity increases in many regions, which can increase the severity of precipitation extremes and consequences like flooding. At the regional and local scales relevant to stakeholders, uncertainty in extremes is large, but generally not well characterized, owing to long-standing gaps in scientific understanding of complex, small-scale physical processes that drive them.

SUMMARY OF THE INVENTION

The present system and method are able to more rigorously quantify the uncertainty in extreme climate events and climate indices to provide stakeholders with best and worst case bounds in metrics used for impacts assessment, hazards planning, and engineering design. The system and method use a Bayesian model that combines and iteratively weights archived data outputs of multiple global climate models against reference observational datasets to estimate probability distributions for global and regional climate extremes and climate indices. The model incorporates prior aggregate understanding of physics by assigning weights to climate models partially according to their ability to capture regional adherence to observed climate data.

The system and method employ a Bayesian framework to build statistical distributions for extremes or climate indices, rather than mean values. The present framework provides an integration of physical relationships between various climate variable using observed and simulated data. For example, there is an expected relationship between precipitation extremes and average temperature, for which there is a significant amount of physical evidence, available in the scientific literature.

The results can be spatially and temporally downscaled and translated to robust stakeholder metrics, such as Intensity-Duration-Frequency curves and engineering load factors, to provide stakeholders with reliable tools for coping with future precipitation extremes and related hydrological extremes.

In one embodiment, a system for providing multivariate climate change forecasting comprises:
one or more processors and memory, and machine-readable instructions stored in the memory that, upon execution by the one or more processors cause the system to carry out operations comprising:
  obtaining, from one or more climate model datasets, climate model data comprising simulated historical climate model data used in one or more climate models and simulated future climate model data from the one or more climate models;
  obtaining, from one or more climate observational datasets, observational data comprising historical observed climate data;
  providing a statistical distribution of extremes or climate indices for one or more variable climate features using the climate model data and the observational model data;
  determining one or more metrics from the variable climate features, each of the metrics comprising:
    a prediction of a future climate variable for a determined future time period,
    a confidence bound of the prediction of the future climate variable for the determined future time period, and
    a prediction bound for the future climate variable for the determined future time period; and
  outputting the one or more metrics to an output device.

In another embodiment, a method for providing multivariate climate change forecasting comprises:
  receiving, at a computer comprising one or more processors and memory, from one or more climate model datasets, climate model data comprising simulated historical climate model data used in one or more climate models and simulated future climate model data from the one or more climate models;
  receiving, at the computer, from one or more climate observational datasets, observational data comprising historical observed climate data;
  providing a statistical distribution of extremes or climate indices for one or more variable climate features using the climate model data and the observational model data;
  determining one or more metrics from the variable climate features, each of the metrics comprising:
    a prediction of a future climate variable for a determined future time period,
    a confidence bound of the prediction of the future climate variable for the determined future time period, and
    a prediction bound for the future climate variable for the determined future time period; and
  outputting the one or more metrics to an output device.

In another aspect of the system or method, the variable climate features include precipitation extremes and temperatures.

In another aspect of the system or method, the variable climate features include one or more of precipitation, temperature, wind direction, wind speed, sea surface temperature, convective available potential energy, soil moisture, crop moisture, droughts, hurricanes, heatwaves, cold snaps, tornadoes, heating degree days, cooling degree days, heatwave intensity, or coldwave intensity.

In another aspect of the system or method, the climate indices include indices representing heating degree days, cooling degree days, soil moisture, precipitation; crop moisture, heatwave intensity, or coldwave intensity.

In another aspect, the system or method further comprise determining a climate model weight for each of the one or more climate models from which the climate model data were obtained.

In another aspect of the system or method, the step of providing a statistical distribution of extremes or climate indices comprises estimating framework parameters using the simulated historical climate model data and the simulated future climate model data over historical and future time periods, the parameters comprising descriptions of the variable climate features and dependences among the variable climate features.

In another aspect of the system or method, the step of providing a statistical distribution of extremes or climate indices comprises: using the climate model data and the observational climate data to obtain a distribution for each climate variable, the distribution described by a set of random unknown parameters, providing a prior distribution for each of the random unknown parameters; and deriving posterior distributions using a Bayesian model.

In another aspect of the system or method, the step of providing a statistical distribution of extremes or climate indices comprises: sorting the climate model data and the observational climate data by numeric magnitude of extreme events or climate indices to obtain rankings; statistically comparing rankings of the climate model data from a least some of the climate models to the rankings of the observational climate data to derive weights for each climate model simulation; and from the weights, deriving a distribution of extreme events or climate indices over a determined time period.

In another aspect of the system or method, in the step of providing a statistical distribution of extremes of climate indices, the distribution is simulated using a Markov Chain Monte Carlo computational engine.

In another aspect of the system or method, the determined future time period comprises a monthly time period, a seasonal time period, an annual time period, or a multi-annual time period.

In another aspect of the system or method, the metrics are determined globally or for a specified geographic region.

In another aspect of the system or method, the metrics include one or more of a future temperature distribution for a specified geographic region, and a future precipitation extremes distribution for a specified geographic region.

In another aspect of the system or method, the metrics include one or more of a future distribution of precipitation, temperature, wind direction, wind speed, sea surface temperature, convective available potential energy, soil moisture, crop moisture, droughts, hurricanes, heatwaves, cold snaps, tornadoes, heating degree days, cooling degree days, heatwave intensity, or coldwave intensity for a specified geographic region.

In another aspect of the system or method, the metrics include one or more bias parameters for any one of the climate model simulations.

In another aspect, the system or method further comprising determining from the metrics a precipitation intensity-duration-frequency curve and outputting the precipitation intensity-duration-frequency curve to the output device.

In another aspect, the system or method further comprise determining from the metrics precipitation extremes projections and estimating changes in rainfall events expected to be exceeded only once on average in the determined future time period.

In another aspect, the system or method further comprise determining from the metrics probable maximum precipitation ratios for the determined future time period and an evolution of the probable maximum precipitation ratios over time.

In another aspect, the system or method further comprise determining from the metrics probable maximum ratios for one or more of precipitation, temperature, wind direction, wind speed, sea surface temperature, convective available potential energy, soil moisture, crop moisture, droughts, hurricanes, heatwaves, cold snaps, tornadoes, heating degree days, cooling degree days, heatwave intensity, and coldwave intensity for a determined future time period and an evolution of the probable maximum ratio over time.

In another aspect, the system or method further comprise determining from the metrics temperature change projections for a specified geographic region.

In another aspect, the system or method further comprise determining from the metrics precipitation extremes change projections for a specified geographic region.

In another aspect, the system or method further comprise determining from the metrics projections of changes in one or more of precipitation, temperature, wind direction, wind speed, sea surface temperature, convective available potential energy, soil moisture, crop moisture, droughts, hurricanes, heatwaves, cold snaps, tornadoes, heating degree days, cooling degree days, heatwave intensity, and coldwave intensity for a specified geographic region.

In another aspect, the system or method further comprise determining from the metrics climate model skill diagnostics.

In another aspect of the system or method, the output device comprises a computer, a personal computer, a workstation, a server, a laptop computer, a tablet computer, a mobile telephone, a mobile computing device, a monitor, a video display device, a printer.

DESCRIPTION OF THE DRAWINGS

The invention will be more fully understood from the following detailed description taken in conjunction with the accompanying drawings in which.

DETAILED DESCRIPTION OF THE INVENTION

The disclosures of U.S. Provisional Patent Application No. 61/971,932, filed Mar. 28, 2014, entitled System for Multivariate Climate Change Forecasting With Uncertainty Quantification, and U.S. Provisional Patent Application No. 61/972,919, filed Mar. 31, 2014, entitled System for Multivariate Climate Change Forecasting With Uncertainty Quantification, are incorporated by reference herein in their entirety.

The system and method can take as input climate data from multiple sources. These inputs can include publicly available data sets outputted and archived from, for example and without limitation, global climate models, regional climate models, hydrological models, reanalysis models, satellite and radar observations, and direct station observations.

The system and method provide an "asynchronous" mapping in which, for observations, extremes of climate variables and their covariates (for example, rainfall extremes and temperature) are sorted by value from lowest to highest. The same sorting is done on simulated data from the climate models. Values are not compared from the same year; rather values are compared in terms of their rank. This asynchronous mapping is useful and novel in this Bayesian context, because climate models do not provide exact forecasts for a particular year, but rather attempt to provide a correct distribution of extremes in a given time period. The system and method can also provide statistical distributions for various climate indices as well as extremes.

Thus, the system and method take the climate data inputs and, through a set of statistical models and software processes, transform them into metrics and informatics useful for generating state of the art long-lead time climate change predictions as well as best estimate uncertainty information surrounding these predictions. These predictions and uncertainties can in turn be fed into a geospatial database where they can be visualized and analyzed in stakeholder decision support systems.

The system and method also produce a variety of diagnostic metrics that are useful for understanding how the statistical framework arrives at predictions and their uncertainty. These can in turn be utilized to understand the reliability of climate model forecasts and how to best tune the statistical framework to improve predictions.

Figure 1:
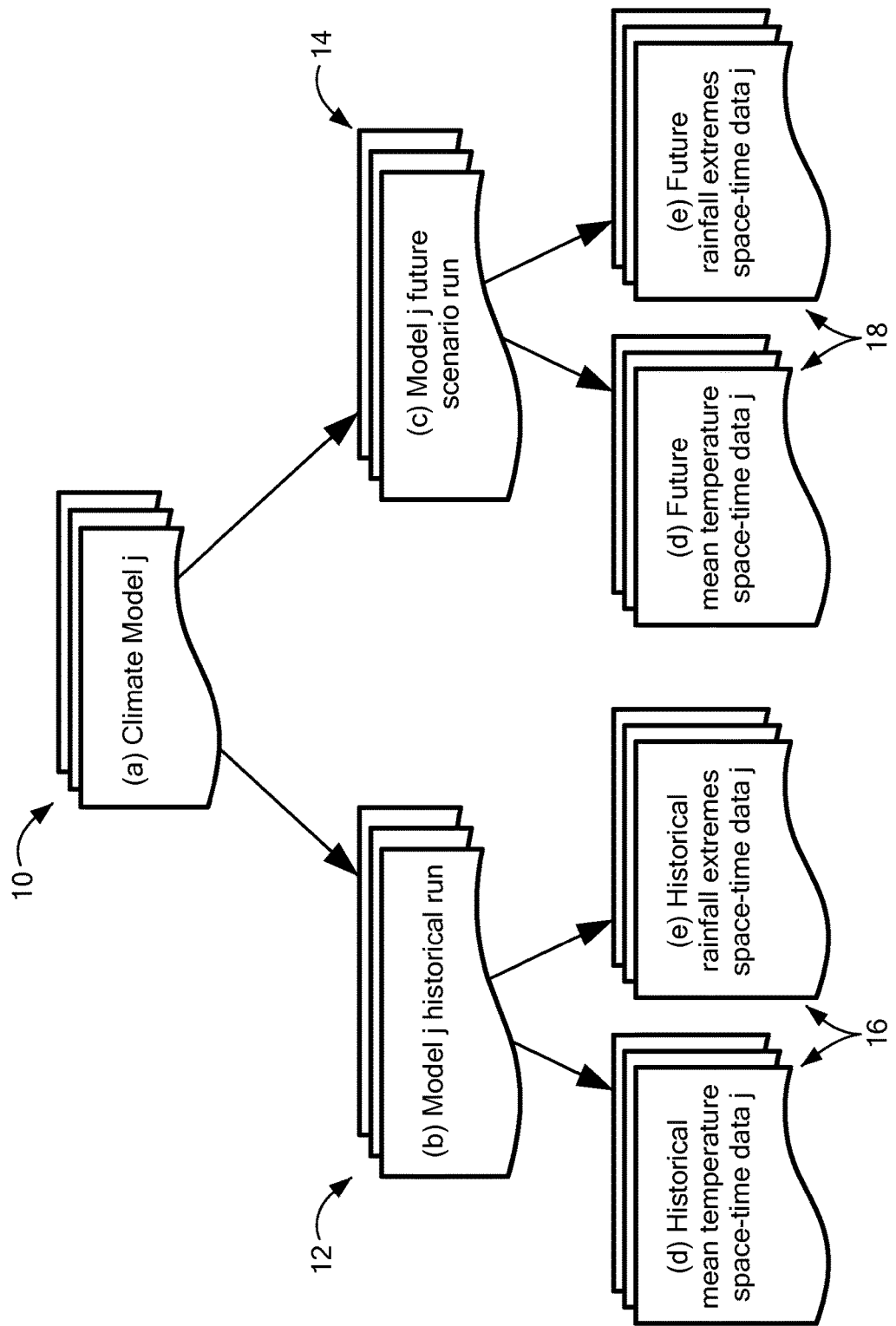
FIG. 1 is a schematic illustration of a data setup for various climate models, using mean temperature and rainfall extremes as an example.

Referring more particularly to FIG. 1, a graphical depiction of the data setup for climate models is described. There is an ensemble or collection 10 of a number J of climate models (a), indexed by subscript j. Three climate models are indicated schematically at 10 in FIG. 1; it will be appreciated that any number of climate models can be used.

Each of the climate models produce simulations (runs) (b) of historical climate 12 and of future climate 14 under greenhouse gas change scenarios. These simulations result respectively in simulated historical climate model data 16 and simulated future climate model data 18 based on assumed socio-economic scenarios of evolutions of global greenhouse emissions used by each model. In one embodiment, using temperature and rainfall extremes as an example, each model contains simulated historical spatio-temporal mean temperature data (c) and precipitation extremes data (d), as well as simulated spatio-temporal mean temperature data (e) and precipitation extremes data (f) for future time periods. Types of simulated historical and future climate model data can include, for example and without limitation, precipitation, temperature, wind direction, wind speed, sea surface temperature, convective available potential energy; soil moisture, crop moisture, droughts, heatwave intensity, coldwave intensity, hurricanes, heatwaves, cold snaps, and tornadoes.

As noted further below, this data is available in the public domain in general, as known by those of skill in the art of using global climate models (GCMs). It is also possible to use regional climate models (RCMs), which are also in many cases publicly available. Some RCMs could be privately generated but are driven by GCM data.

Figure 2:
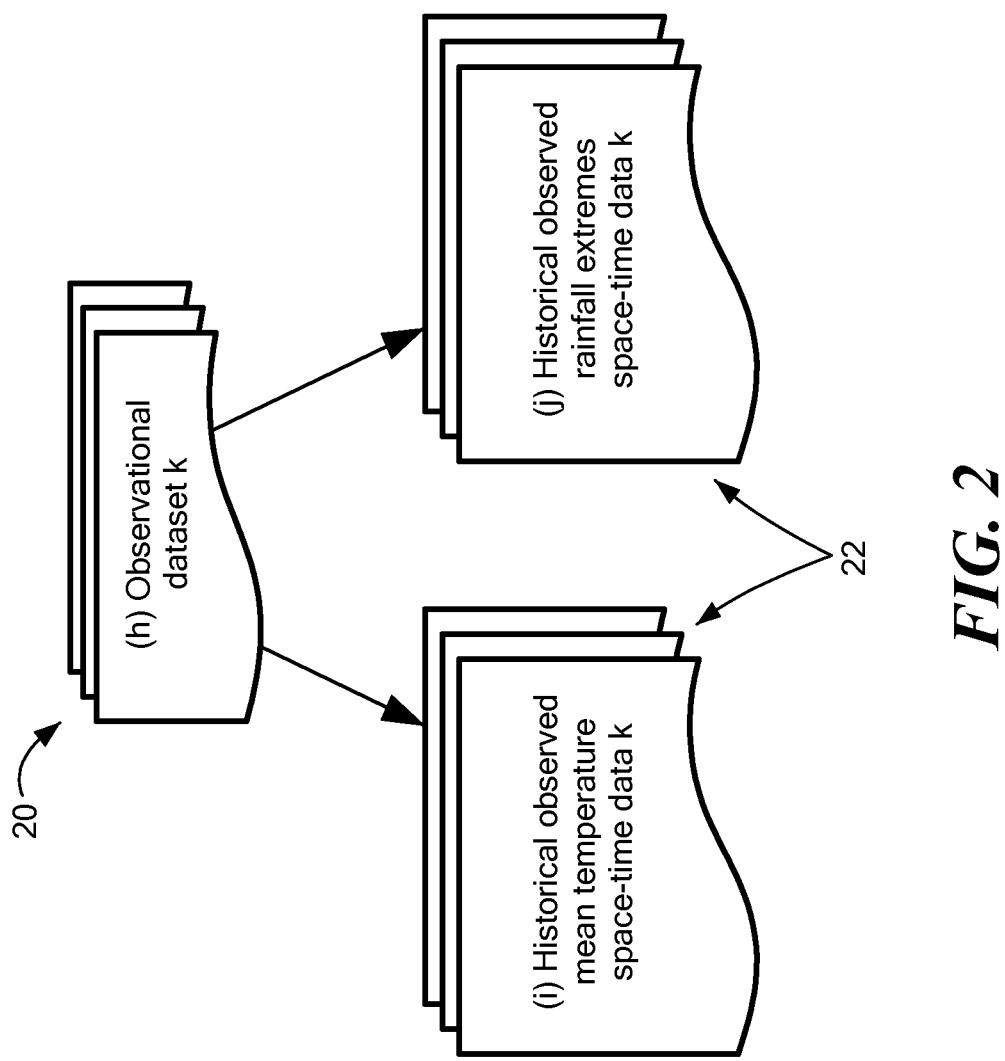
FIG. 2 is a schematic illustration of a number of observational datasets using the examples of FIG. 1.

FIG. 2, similar to FIG. 1, is a schematic graphical depiction of observational datasets. A number K of datasets 20 of observations (g), each indexed by subscript k, contain spatio-temporal observational data 22, such as mean temperature data (h) and precipitation extremes data (i). As noted below, various observational datasets are available in the public domain, as known by those of skill in the art. Types of data can include, for example and without limitation, precipitation, temperature, wind direction, wind speed, sea surface temperature, convective available potential energy, soil moisture, crop moisture, droughts, heatwave intensity, coldwave intensity, hurricanes, heatwaves, cold snaps, and tornadoes.

Figure 3:
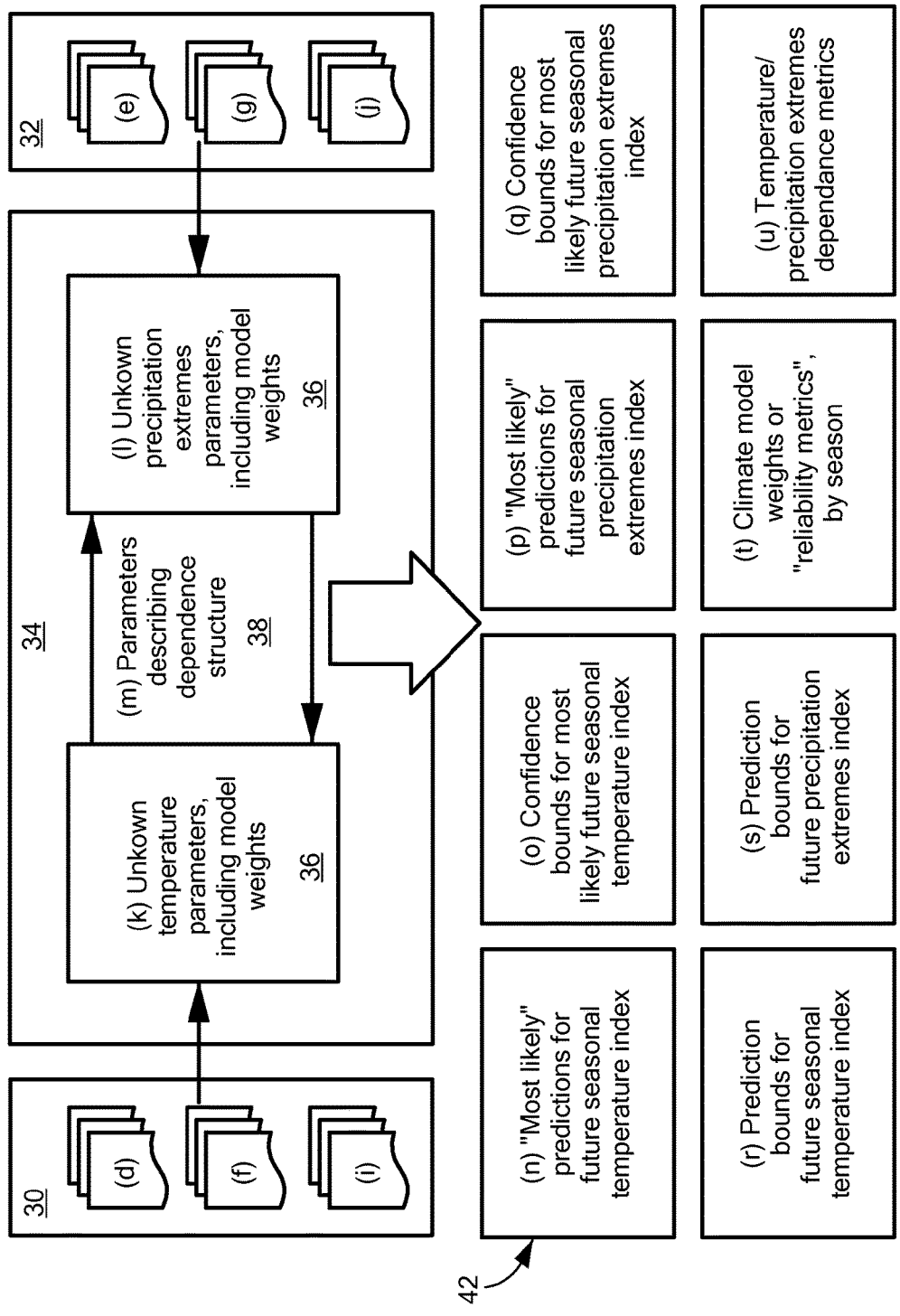
FIG. 3 is a schematic illustration of a statistical framework model using the examples of FIG. 1.

Using the simulated historical and future climate model data 16, 18 and the observational data 22, a statistical distribution of climate variable extremes and/or climate indices can be determined. Referring to FIG. 3, box 30 shows, as an example, all temperature data (d, f, i), both from climate models and from observations, as shown in FIGS. 1-2. Similarly, using the same example, box 32 shows all precipitation extremes data (e, g, j), both from climate models and observations, as shown in FIGS. 1-2. All of these data entities are fed into a statistical framework 34, which employs a Bayesian model (described with more particularity below). The framework uses the data entities to estimate unknown framework parameters 36 that describe features of one or more climate variables as well as dependence structures 38 between the climate variables. As an example, the parameters can describe features of mean temperature (k) and precipitation extremes (l). The parameters can also include weights for each climate model.

The statistical framework 34 defines a model between the data and all the unknown parameters. The framework employs a Bayesian model that builds a statistical distribution for climate variable extremes or indices. The Bayesian model framework provides a ranking by sorting extremes or indices (and their covariates) by value from lowest to highest. Values are not compared based on a same year, but in terms of their rank over a given time period.

More particularly, the framework employs an algorithm that this a collection of Bayesian posterior distributions equations that integrate (i) multiple observations of climate extremes or indices and covariates that may contain information relevant to their prediction; (ii) multiple historical simulations from multiple climate models, meant to emulate the statistical attributes of the observations in (i); and (iii) multiple future simulations from multiple climate models, all to assign weights to the model simulations in terms of their abilities to replicate observed covariance relationships between extremes and covariates. As such, the posterior distributions of extremes or indices distributions in the future reflect weighted averages of model simulations and in practice, are simulated using a Markov Chain Monte Carlo (MCMC) computational method.

Extremes can be determined for any of type of climate data, such as the data noted above. Climate indices can include, for example and without limitation, heating degree days (based on temperature), cooling degree days (based on temperature), Palmer Drought Severity Index (based on soil moisture); Standardized Precipitation Index (based on precipitation or lack of precipitation); crop moisture index (based on temperature and precipitation), heatwave intensity (based on temperature and/or humidity), and coldwave intensity (based on temperature and/or wind speed).

After fitting the model to the data, one can obtain a variety of metrics of interest 42 from the framework. These metrics can include, for example, a prediction of a future climate variable for a determined future time period, a confidence bound of the prediction of the future climate variable for the determined future time period, and a prediction bound for the future climate variable for the determined future time period.

In one example, shown in FIG. 3, output metrics can include (n) predictions of future temperature given an assumed greenhouse gas scenario as well as (o) confidence bounds around that prediction. Metric (n) can be annual average temperature in the future relative to the past or a seasonal cycle in the future, i.e. a month by month index of average temperature change; likewise metric (o) can be for annual data or monthly data. Likewise, the same predictions and confidence bounds can be generated for precipitation extremes in the future (p)-(q). For both (o) and (q) are confidence bounds for most likely changes only. They are not bounds describing year to year variability but instead climate behavior averaged over the entirety of a future time period (e.g., over 20 or 30 years, the average annual or month by month mean temperature and precipitation extremes predictions). On the other hand, metrics (r) and (s) are prediction bounds, or the upper and lower bound of behavior that could be seen in any one given year of the future time period, for mean temperature and precipitation extremes, respectively. These by definition are mathematically wider than metrics (o) and (q). Finally, metric (t) provides annual average and monthly information on how much weight was assigned to each climate model j and what those weights are based on (i.e., why one might trust one climate model more than another). This information can be useful to various science communities. Metrics (u) are metrics that describe the estimated relationship between temperature and precipitation extremes as well as climate model deviations from those estimates. This provides more information on true climate in a geographic region of interest and which climate models are estimating that dependence structure correctly versus incorrectly.

Figure 4:
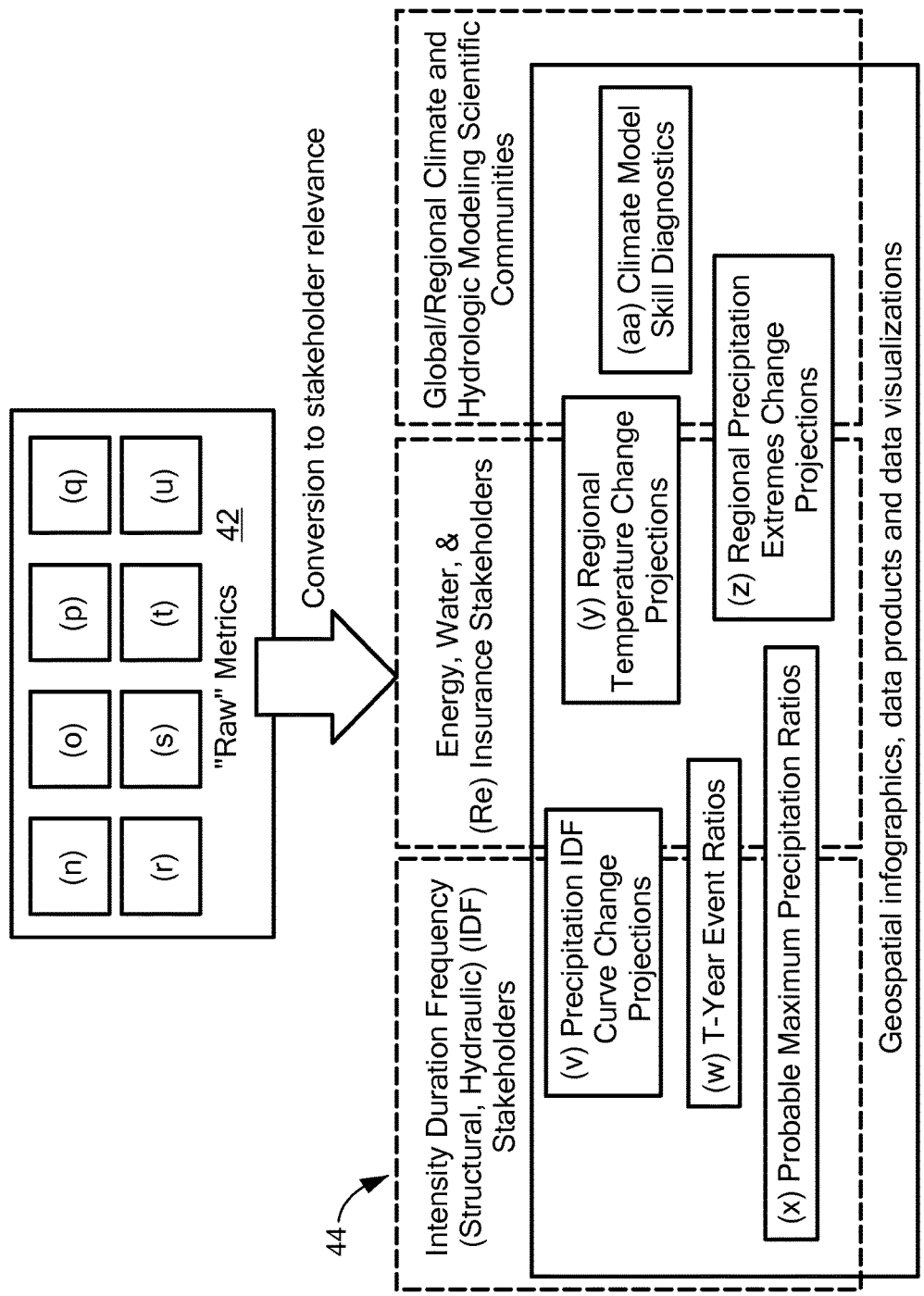
FIG. 4 is a schematic illustration of determining various outputs from the statistical framework model of FIG. 3.

In FIG. 4, the metrics of interest 42 from FIG. 3 are shown here in the top box. They are "raw" in the sense that they are useful but should be converted to forms and portrayed through mediums that stakeholders can readily use. For example, those more "raw" metrics of interest can be converted into a variety of outputs 44 such as geospatial infographics, data products, and data visualizations that can be of interest to a variety of stakeholders. For example, metric (v) takes precipitation extremes projections and converts them into intensity-duration-frequency (IDF) curves or data that feeds into IDF curves, which are tools commonly used by civil engineering stakeholders for structural and hydraulic design applications. Metric (w) similarly takes precipitation extremes projections and estimates changes in T-year events, or rainfall events that are expected to only happen once every T years. Metric (x) is the same idea but for Probable Maximum Precipitation (PMP) estimates and how they will evolve over time. Metrics (v)-(x) are derived from precipitation extremes. Metrics (y)-(z) are more direct consequences of the statistical framework. Metrics (aa) are diagnostics about climate models that can inform the broadly defined science communities about models and potential areas for improvement or innovation.

The gray areas of 44 represent examples of industries and stakeholders who would be recipients of the aforementioned products. The position of metrics (v) (aa) represents where the products are likely valuable in terms of those stakeholders.

The outputs or metrics from the framework 34 can include, for example, a simulated future temperature distribution for a given geographic region or a simulated future precipitation extremes distribution for a given geographic region. These can be broken down into "T-year events," for example, a distribution for a 25-year precipitation event. This means that, in that future time period (which may be some 30 year window, like 2016-2045, for example), this is the distribution of uncertainty around a rainfall event that would only expect to be see exceeded once every 25 years.

The framework outputs can be used to provide bias parameters for any individual climate model, for both temperature and for precipitation extremes, to give an indication of how incorrect the particular model is on average.

The framework can provide weights for each climate model, which signify the relative amount each particular climate model can be trusted. For example, temperature weights reflect a mixture of (1) how skillful a climate model is at emulating historically observed temperature and (2) how much it agrees with its peers in terms of future projections. Precipitation extremes weights reflect a mixture of (1) how skillful a climate model is at emulating historically observed precipitation extremes and (2) how much it agrees with its peers in terms of future projections and (3) how well the climate model emulates real relationships between observed temperature and precipitation extremes. Weights can be helpful in understanding which climate models are doing well and hence which physical processes they are getting right, which can potentially be useful feedback for the climate modeling community.

As noted above, the framework 34 can employ data from any suitable dataset. As one example, the Intergovernmental Panel on Climate Change, fifth report (CMIP5) has archived global climate model (GCM) data, which provides outputs from many global climate models that have been developed, run, and their outputs saved for others to analyze. These models include historical model outputs/simulations, in which the GCMs attempt to emulate the statistics of climate over years already experienced subject to past greenhouse gas conditions. The present framework can harness data from years in these historical simulations and compares them to real observed data from the same period. Also, these models include future model outputs, in which the GCMs assume some future greenhouse gas trajectory and then do detailed "what if" modeling of how the earth would look over this time period (say, 2016-2100). The present framework provides credible information on uncertainty distributions for these models.

As another example, meteorological data can be found at egr.scu.edu/emaurer/data.shtml, under "Gridded Observed Meteorological Data." As a further example, observational datasets can also be found that are publically available are described in journals.ametsoc.org/doi/abs/10.1175/JCLI-D-12-00508.1. These two datasets have been used in the present system as the observational datasets that were compared to the GCM historical simulations, which influences the weights according the GCM historical simulations, which in turn inform the distribution of future rainfall extremes.

The system and method can be used in conjunction with or integrated into web portals or systems, products, and services of other firms or ventures that provide geospatial data visualization, with the capability to integrate the predictions and uncertainty information into the geospatial data visualization. The output metrics can be transmitted to any suitable output device. Output devices can include, as examples and without limitation, a computer, a personal computer, a workstation, a server, a laptop computer, a tablet computer, a mobile telephone, a monitor, a display device, a printer. Suitable graphical interfaces and applications can be provided to provide the output in any desired format or visualization.

As one manifestation suitable for a sophisticated user, the system and method can be available via an Internet browser. For example, users can conduct sophisticated analyses by uploading their data, for example location and details on structures they are planning on building, and contextualizing the appropriateness of their designs with best and worst case bounds from the present model's projections. In that same module, users can conduct analyses including custom cost-risk tradeoff assessments and risk-adjusted net present value calculations of proposed structure designs. These users can be engineers, scientists, and/or project managers that need to justify their decisions to upper level management or to contacts in the insurance industry, who may need to, for example, validate the resilience of their designs to offer them discounted insurance rates.

The system and method can be available in a simpler form, for executive level users or organizational purchasers of technology. This system can also be available via a laptop or desktop Internet browser. This user typically does not need to use it on a daily basis but more in terms of understanding the value add it brings for his or her organization. The user can interact with the system and method through specific case studies and demos, explore the outputs it provides, and/or explore the ability to interact with it by providing data to it. This system and method can provide a basis for quick decision making and product evaluation.

The system and method can be available through a mobile application. This variant is designed for simpler interaction with lower and upper bound projections of climate indices of interest. It can be designed to work alone (a simple query that calls a projection given a user's geospatial location with a few simple inputs the user provides, e.g., the type of climate index they need, perhaps a snow or rain load, or characteristics of a 100-year storm). As a mobile application, the system can also be designed to interact via a database, with a more sophisticated variant of the system. For example, an onsite architect could query the design specifications that for example, a project manager or engineer provided via a sophisticated analysis.

Via an application programming interface (API), other products at other organizations can integrate model outputs form the present system and method into their software outputs. For example, an architectural computer aided design (CAD) software can use geospatial projections of extremes and translate them to diagnostics that a user of the software could see when he or she is designing a building somewhere in space.

The metrics determined by the system and method can be useful in a variety of applications. For example, the metrics can be used to generate intensity duration frequency (IDF) curves and/or probable maximum precipitation (PMP) analytics, which are used in hydraulic and structural engineering and the water resources sector. As an example, the system can be used to provide a probability of rainfall level exceedance, such as the probability of rainfall greater than, e.g., 3 inches in 24 hours in a particular geographic region. The metrics can be used as an input for flood hazard modeling and to derive appropriate rain or snow load factures used in structural engineering. The system can be used for weather, environmental, and weather extremes predictions for the energy, insurance, agriculture industries, and for climate model diagnostics for the broad research sector.

For example, the generation of new, state of the art IDF curves can be used by, for example, structural engineers, hydraulic engineers from municipalities, private contractors, and others in redefining design specifications to handle a changing global, regional, and local climate with changing extreme and severe weather events and hazards.

As another example, predictions for climate change indicators relevant to the energy industry can include predictions and uncertainty therein relevant to metrics such as Heating Degree Days and Cooling Degree Days, which are commonly used in energy planning and demand forecasting. These predictions can be useful in long-term planning for government or industrial entities that need to do long-term energy supply and demand-based planning where it is expected that climate change will alter energy needs into the future.

Further applications exist in the fields of agricultural and crop speculation, food security, long term insurance, and financial industries with weather and climate risk dependencies.

The data model of framework 34 is described with more particularity as follows, using temperature and precipitation extremes as an example. The indexing notation is the following:

$j: 1, \ldots J$—index for GCMs $k: 1, \ldots K$—index for (potentially multiple) observational datasets $m: 1, \ldots M$—index for seasons (e.g., months or summer, autumn, etc.)

$q: 1, \ldots Q$—index for quantiles of precipitation maxima (i.e., where $q=Q$ is the most extreme precipitation event, one that we only expect to see every Q years and $q=1$ the least, or an event we expect to be met or exceeded every year). This is for the "historical" data only (i.e., the time regime where we compare observations to GCM back-casts).

$q': 1, \ldots Q'$: same, but for the future period, or the time regime for which we are actually trying to build a statistical (distributional) forecast.

Each of the following variables is obtained from data. Each is assumed to follow a distribution captured by a set of random (unknown) parameters. Each are described as follows:

1. Observed temperature follows a normal distribution with an unknown mean, $\mu_m$, and known variance, $\lambda_k^{-1}$, which also ultimately serves as the weight we assign to observations in determining $\rho_m$:

$$O_{k,m,q} \sim N(\mu_m, \lambda_k^{-1})$$

2. Temperature from Global Climate Model (GCM) hindcasts, which also follow a normal distribution with mean $\mu_m$ but also with an unknown bias, $\gamma_{j,m}$, and an unknown variance/inverse weight $\lambda_j^{-1}$. This weight will ultimately determine each GCM's relative contribution to determining $\mu_m$:

$$X_{j,m,q} \sim N(\mu_m + \gamma_{j,m}, \lambda_j^{-1})$$

3. Temperature from GCM projections, which also follow a normal distribution with mean $\nu_m$ but also with an unknown bias, $\gamma_{j,m}'$ and the same unknown variance/inverse weight $\lambda_j^{-1}$, but scaled with $\theta_m^{-1}$ (which, if it's larger than 1, and we want that to be the case, will really be saying temperature in the future is more uncertain/variable than historical temperature, which makes sense):

$$Y_{j,m,q} \sim N(\nu_m + \gamma_{j,m}', \theta_m^{-1} \lambda_j^{-1})$$

4. Historical, observed log-transformed precipitation extremes quantiles also follow a normal distribution with a mean described by a unknown 'level', $\mathbb{C}_{m,q}$, and a parameter $\phi_m$ to quantify how that value varies with temperature. $\varepsilon_{k,m}^{-1}$ is the variance; it is fixed, and, as with temperature, also reflects the weight we put on observations:

$$W_{k,m,q} \sim N(\mathbb{C}_{m,q} \phi_m (O_{k,m,q} - \mu_m), \varepsilon_{k,m}^{-1})$$

5. The same as 4 but for historical GCM simulated precipitation extremes, and with a GCM, season-specific bias term constant over time, $\tau_{j,m}$, and a variance (inverse weight) $\varepsilon_{j,m}^{-1}$:

$$Z_{j,m,q} \sim N(\mathbb{C}_{m,q} + \tau_{j,m} + \phi_m(X_{j,m,q} - \mu_m - \gamma_{j,m}), \varepsilon_{j,m}^{-1})$$

6. The same as 5 but for future GCM simulated precipitation extremes. The scaling parameter, $\chi_m^{-1}$, like $\theta_m^{-1}$ for temperature, if larger than 1, reflects higher uncertainty/variability in future extremes:

$$Z_{j,m,q}' \sim N(\mathbb{C}_{m,q}' + \tau_{j,m} + \phi_m'(Y_{j,m,q} - \nu_m - \gamma_{j,m}'), \chi_m^{-1} \varepsilon_{j,m}^{-1})$$

The goal is to then find statistical distributions for each of the unknowns that all fall on the right side of the equations 1-6. The ultimately target variables are $\mathbb{C}_{m,q}$, and $\mathbb{C}_{m,q}' - \mathbb{C}_{m,q}$, or the behavior of "true" future precipitation extremes, both alone and compared to historical "true" precipitation extremes. To do this, a Markov Chain Monte Carlo (MCMC) computational routine can be used that looks at each unknown sequentially conditional on current knowledge about every other unknown. This is a Bayesian model, then, which needs prior distributions for each unknown.

Each of the unknowns is listed below and has a prior distribution. The prior distributions reflect the belief, before looking at any data, in how the unknowns should behave statistically. In computational practice, all of these parameters are set to be quite small, relatively speaking, so that they exert much less influence on the posterior distributions (described further below) than the actual data.

$$P(\mu_m) \sim N(\mu_{0,m}, \sigma_{0,m}^{-1})$$

$$P(\gamma_{j,m}) \sim N(\gamma_{0,m}, \zeta_{0,m}^{-1})$$

$$P(\nu_m) \sim N(\nu_{0,m}, \eta_{0,m}^{-1})$$

$$P(\gamma_{j,m}') \sim N(\gamma_{0,m}', \kappa_{0,m}^{-1})$$

$$P(\lambda_{j,m}) \sim G(\alpha_{0,m}, \beta_{0,m}^{-1})$$

$$P(\theta_m) \sim G(\delta_{0,m}, \in_{0,m})$$

$$P(\mathbb{C}_{m,q}) \sim N(\mathbb{C}_{0,m,q}, \overline{\omega}_{0,m}^{-1})$$

$$P(\tau_{j,m}) \sim N(\tau_{0,m}, \in_{0,m}^{-1})$$

$$P(\phi_m) \sim N(\phi_{0,m}, \psi_{0,m}^{-1})$$

$$P(\mathbb{C}_{m,q}') \sim N(\mathbb{C}_{0,m,q}', \xi_{0,m}^{-1})$$

$$P(\phi_m') \sim N(\phi_{0,m}', \omega_{0,m}^{-1})$$

$$P(\varepsilon_{j,m}) \sim G(\delta_{0,m}, \pi_{0,m})$$

$$P(\chi_m) \sim G(\rho_{0,m}, \rho_{0,m})$$

The posterior distributions, listed as follows, are derived using the priors and data models. These are used in the MCMC routine to approximate distributions for each unknown parameter. The MCMC routine itself generates random numbers from each of these distributions, one at a time, updating all of the unknowns with new values sequentially, so that each unknown is updated conditional on the data and the current, newest generated values of the unknowns. This is done many (e.g., N=10,000) times, iteratively. These values are stored in a posterior distribution, which are then analyzed (e.g., see the Example described below).

$$P(\mu_m | \ldots) \propto N\left(\frac{B}{A}, \frac{1}{A}\right)$$

where $$A = \sigma_{0,m} + Q\left(\sum_k \lambda_{k,m} + \sum_j \lambda_{j,m} + \phi_m^2 \left[\sum_k \varepsilon_{k,m} + \sum_j \varepsilon_{j,m}\right]\right)$$

and $$B = \sigma_{0,m} \mu_{0,m} + \sum_{k,q} \lambda_{k,m} O_{k,m,q} +$$
$$\sum_{j,q} \lambda_{j,m} X_{j,m,q} + \phi_m \sum_{k,q} \varepsilon_{k,m}(\phi_m O_{k,m,q} + \mathbb{C}_{m,q} - W_{k,m,q}) +$$
$$\phi_m \sum_{j,q} \varepsilon_{j,m}(\phi_m X_{j,m,q} - \phi_m \gamma_{j,m} + \mathbb{C}_{m,q} + \tau_{j,m} - Z_{j,m,q})$$

$$P(\nu_m | \ldots) \propto N\left(\frac{D}{C}, \frac{1}{C}\right)$$

where $$C = \eta_{0,m} + Q'\left(\theta_m \sum_j \lambda_{j,m} + \phi_m'^2 \chi_m \sum_j \varepsilon_{j,m}\right)$$

and $$D = \eta_{0,m} \nu_{0,m} + \theta_m \sum_{j,q'} \lambda_{j,m} Y_{j,m,q} +$$
$$\chi_m \phi_m' \sum_{j,q} \varepsilon_{j,m}(\phi_m' Y_{j,m,q'} - \phi_m' \gamma_{j,m}' + \mathbb{C}_{m,q'}' + \tau_{j,m} - Z_{j,m,q'}')$$

$$P(\lambda_{j,m} | \ldots) \sim G(\alpha, \beta)$$

where $$\alpha = \alpha_0 + \frac{Q}{2} + \frac{Q'}{2}$$

and $$\beta = \beta_0 + 0.5 \sum_q (X_{j,m,q} - \gamma_{j,m} - \mu_m)^2 + 0.5 \theta_m \sum_{q'} (Y_{j,m,q'} - \gamma_{j,m}' - \nu_m)^2$$

$$P(\theta_m | \ldots) \sim G(\alpha, \beta)$$

-continued where $$\delta = \delta_0 + \frac{J}{2} + \frac{Q'}{2}$$

and $$\epsilon = \epsilon_0 + 0.5 \sum\nolimits_{j,q'} \lambda_{j,m}(Y_{j,m,q'} - \gamma'_{j,m} - \nu_m)^2$$

$$P(\gamma_{j,m} | \ldots) \sim N\left(\frac{F}{E}, \frac{1}{E}\right)$$

where $$E = \zeta_{0,m} + Q(\lambda_{j,m} + \phi_m^2 \varepsilon_{j,m})$$

and $$F = \zeta_{0,m}\gamma_{0,m} + \lambda_{j,m}\sum\nolimits_q (X_{j,m,q} - \mu_m) +$$
$$\phi_m \sum\nolimits_q \varepsilon_{j,m}(\phi_m[X_{j,m,q} - \mu_m] + \mathbb{C}_{m,q} + \tau_{j,m} - Z_{j,m,q})$$

$$P(\gamma'_{j,m} | \ldots) \sim N\left(\frac{H}{G}, \frac{1}{G}\right)$$

where $$G = \kappa_{0,m} + Q'(\theta_m \lambda_{j,m} + \chi_m \phi'^2_m \varepsilon_{j,m})$$

and $$H = \kappa_{0,m}\gamma'_{0,m} + \sum\nolimits_q \theta_m \lambda_{j,m}(Y_{j,m,q'} - \nu_m) +$$
$$\chi_m \phi'_m \sum\nolimits_q \varepsilon_{j,m}(\phi'_m[Y_{j,m,q'} - \nu_m] + \mathbb{C}'_{m,q'} + \tau_{j,m} - Z'_{j,m,q'})$$

$$P(\mathbb{C}_{m,q} | \ldots) \sim N\left(\frac{BB}{A}, \frac{1}{AA}\right)$$

where $$AA = \overline{\omega}_{0,m} + \sum\nolimits_k \varepsilon_{k,m} + \sum\nolimits_j \varepsilon_{j,m}$$

and $$BB = \overline{\omega}_{0,m}\mathbb{C}_{0,m,q} + \sum\nolimits_k \varepsilon_{k,m}(W_{k,m,q} - \phi_m[O_{k,m,q} - \mu_m]) +$$
$$\sum\nolimits_j \varepsilon_{j,m}(Z_{j,m,q} - \tau_{j,m} - \phi_m[X_{j,m,q} - \mu_m - \gamma_{j,m}])$$

$$P(\mathbb{C}'_{m,q'} | \ldots) \sim N\left(\frac{DD}{CC}, \frac{1}{CC}\right)$$

where $$CC = \xi_{0,m} + \chi_m \sum\nolimits_j \varepsilon_{j,m}$$

and $$DD = \xi_{0,m}\mathbb{C}'_{0,m,q'} + \sum\nolimits_j \varepsilon_{j,m}(Z'_{j,m,q'} - \tau_{j,m} - \phi'_m[Y_{j,m,q'} - \nu_m - \gamma'_{j,m}])$$

$$P(\tau_{j,m} | \ldots) \sim N\left(\frac{FF}{EE}, \frac{1}{EE}\right)$$

where $$EE = \epsilon_{0,m} + Q\varepsilon_{j,m} + Q'\chi_m \varepsilon_{j,m}$$

and $$FF = \sum\nolimits_q \varepsilon_{j,m}(Z_{j,m,q} - \mathbb{C}_{m,q} - \phi_m[X_{j,m,q} - \mu_m - \gamma_{j,m}]) +$$
$$\chi_m \sum\nolimits_{q'} \varepsilon_{j,m}(Z'_{j,m,q'} - \mathbb{C}'_{m,q'} - \phi'_m[Y_{j,m,q'} - \nu_m - \gamma'_{j,m}])$$

$$P(\phi_m) \sim N\left(\frac{HH}{GG}, \frac{1}{GG}\right)$$

where $$GG = \psi_{0,m} + \sum\nolimits_{k,q} \varepsilon_{k,m}([O_{k,m,q} - \mu_m]^2) + \sum\nolimits_{j,q} \varepsilon_{j,m}([X_{j,m,q} - \mu_m - \gamma_{j,m}]^2)$$

and $$HH = \psi_{0,m}\phi_{0,m} + \sum\nolimits_{k,q} \varepsilon_{k,m}([O_{k,m,q} - \mu_m][W_{k,m,q} - \mathbb{C}_{m,q}]) +$$

$$\sum\nolimits_{j,q} \varepsilon_{j,m}([X_{j,m,q} - \mu_m - \gamma_{j,m}][Z_{j,m,q} - \mathbb{C}_{m,q} - \tau_{j,m}])$$

$$P(\phi'_m) \sim N\left(\frac{JJ}{II}, \frac{1}{II}\right)$$

where $$II = \omega_{0,m} + \chi_m \sum\nolimits_{j,q'} \varepsilon_{j,m}([Y_{j,m,q'} - \nu_m - \gamma'_{j,m}]^2)$$

and $$JJ = \omega_{0,m}\phi'_{0,m} + \chi_m \sum\nolimits_{j,q'} \varepsilon_{j,m}([Y_{j,m,q'} - \nu_m - \gamma'_{j,m}][Z'_{j,m,q'} - \mathbb{C}'_{m,q'} - \tau_{j,m}])$$

$$P(\varepsilon_{j,m} | \ldots) \sim G(\delta, \pi)$$

where $$\delta = \delta_{0,m} + \frac{Q}{2} + \frac{Q'}{2}$$

and $$\pi = \pi_{0,m} + 0.5 \sum\nolimits_q [Z_{j,m,q} - \mathbb{C}_{m,q} - \tau_{j,m} - \phi_m(X_{j,m,q} - \mu_m - \gamma_{j,m})]^2 +$$
$$0.5\chi_m[Z'_{j,m,q'} - \mathbb{C}'_{m,q'} - \tau_{j,m} - \phi'_m(Y_{j,m,q'} - \nu_m - \gamma'_{j,m})]^2$$

$$P(\chi_m | \ldots) \sim G(\rho, \varrho)$$

where $$\rho = \rho_{0,m} + \frac{J}{2} + \frac{Q'}{2}$$

and $$\varrho = \varrho_{0,m} + \sum\nolimits_{j,q'} \varepsilon_{j,m}[Z'_{j,m,q'} - \mathbb{C}'_{m,q'} - \tau_{j,m} - \phi'_m(Y_{j,m,q'} - \nu_m - \gamma'_{j,m})]^2$$

EXAMPLE

Results using out-of-sample observations indicate that the model produces robust probability distributions for all considered quantiles of extremes and is more reliable than the equally weighted multi-model average projections that have often been considered to be the best choice in prior art literature and climate impact assessments reports.

Figure 10A:
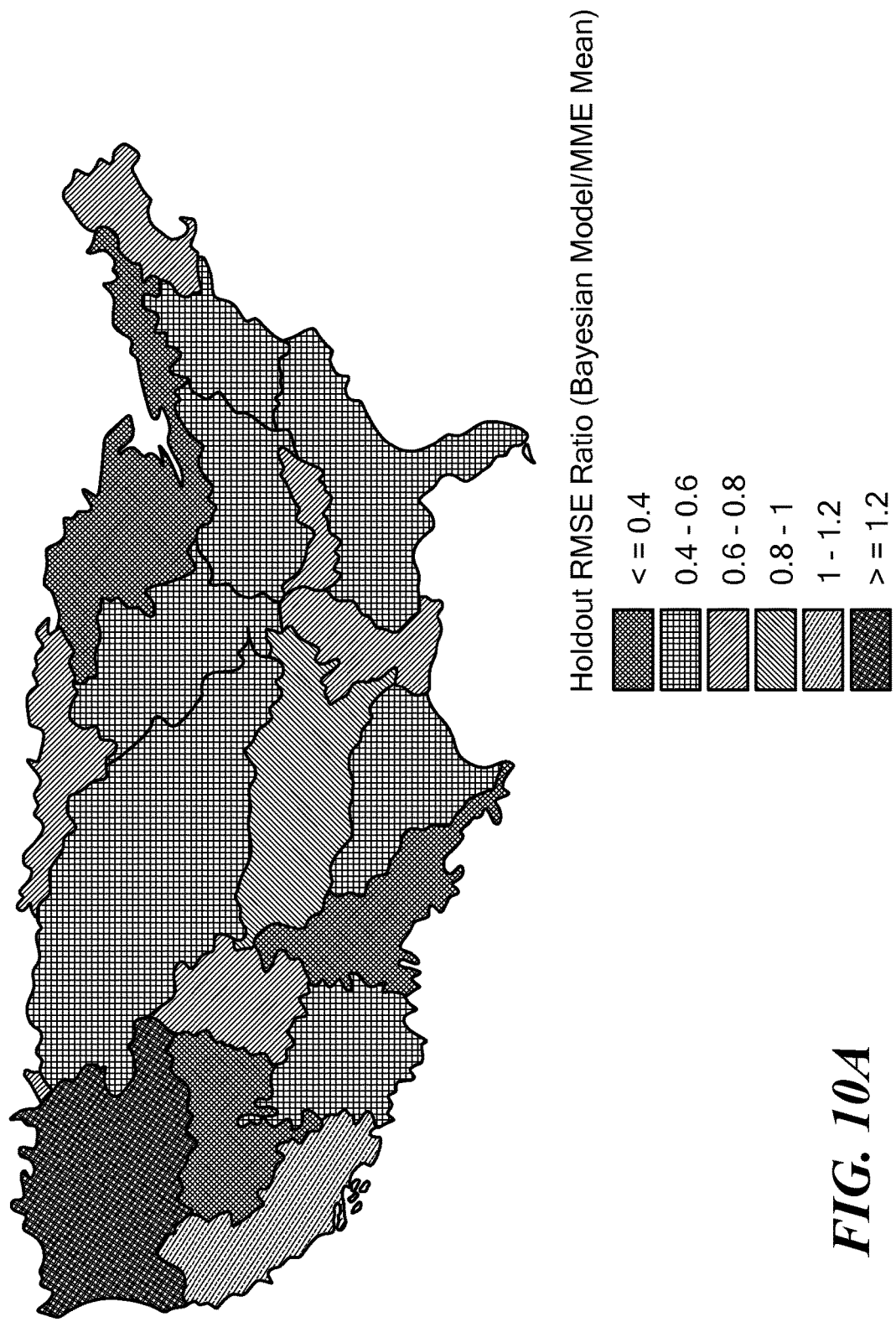
FIG. 10A is a graphical comparison of precipitation extremes for the posterior distributions determined by the present system and method and original Global Climate Model forecasts.
Figure 10B:
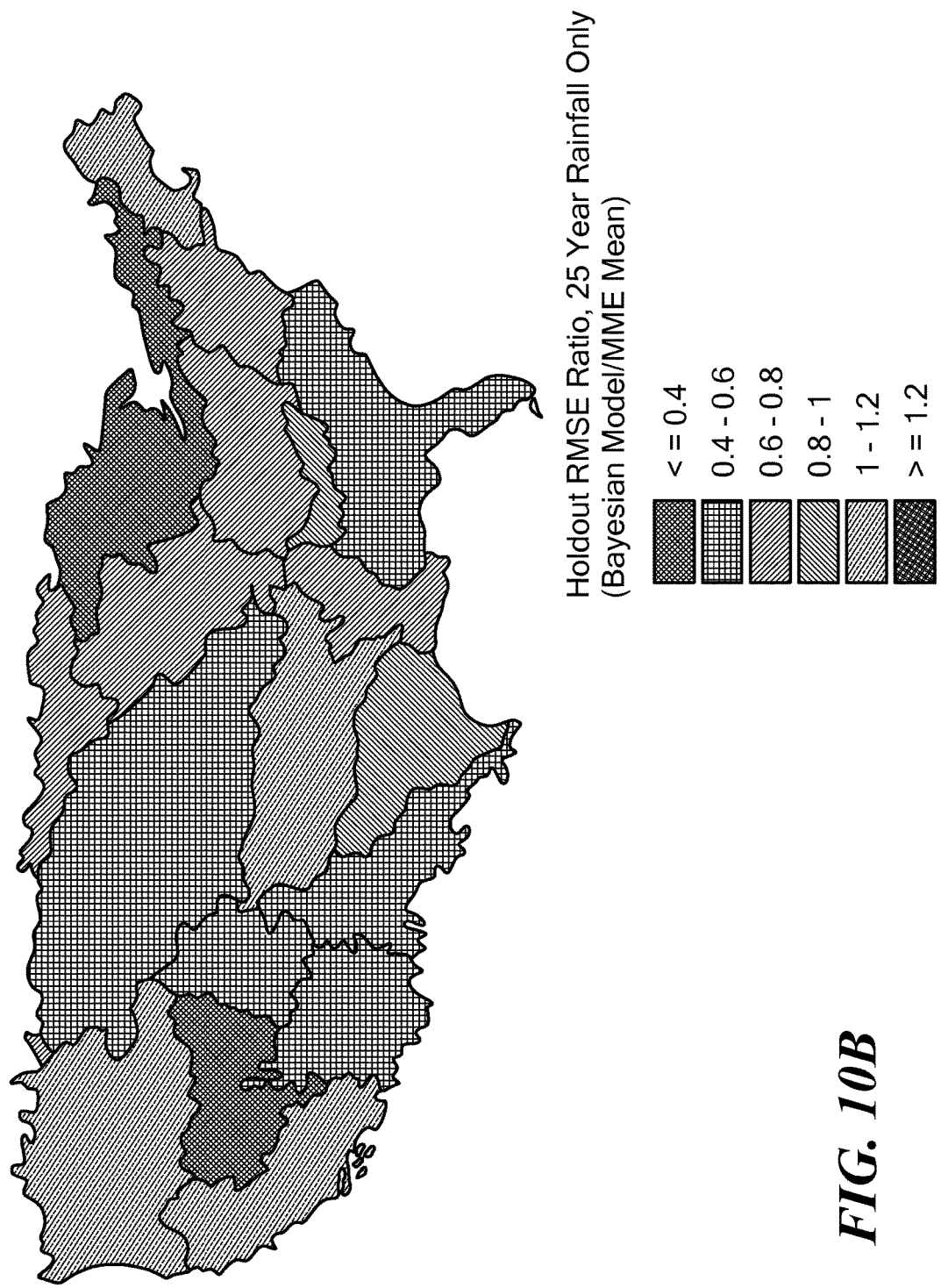
FIG. 10B is a further graphical comparison similar to FIG. 10A for 25 year precipitation extremes events.
Figure 11:
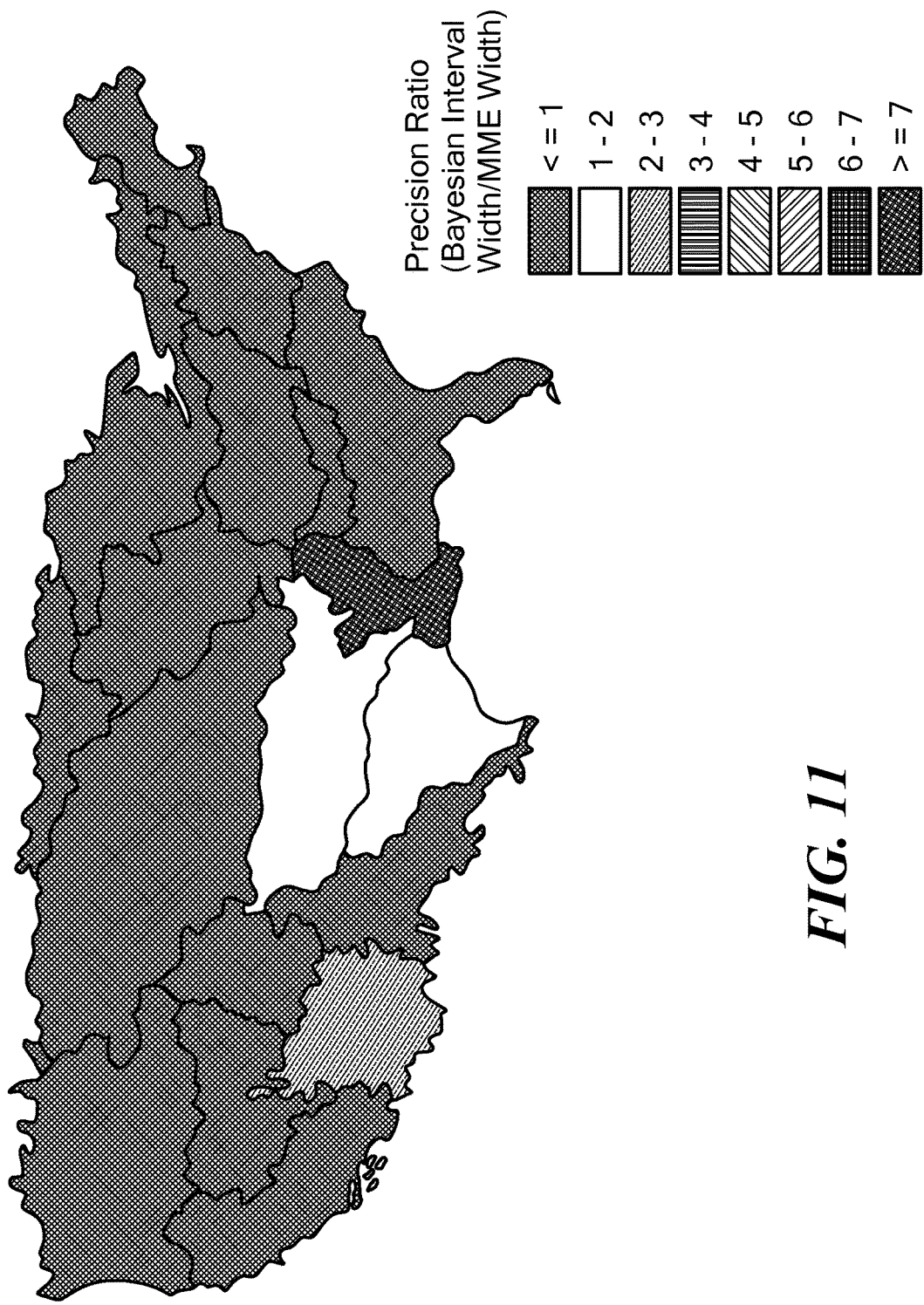
FIG. 11 is further graphical comparison of precipitation extremes for full Bayesian posterior distributions determined by the present system and method and original Global Climate Model forecasts.

Reference is made to FIGS. 5-11. FIGS. 5-9 depict data, using 16 Global Climate Models (GCMs), from one watershed region, in Missouri ("Missouri Region", as defined by the United States Geological Survey's Watershed Boundary Dataset, Hydrologic Unit 2. FIGS. 10-11 show analytics over 18 watersheds that encompass the continental U.S., to obtain a meta-analysis perspective.

Figure 5:
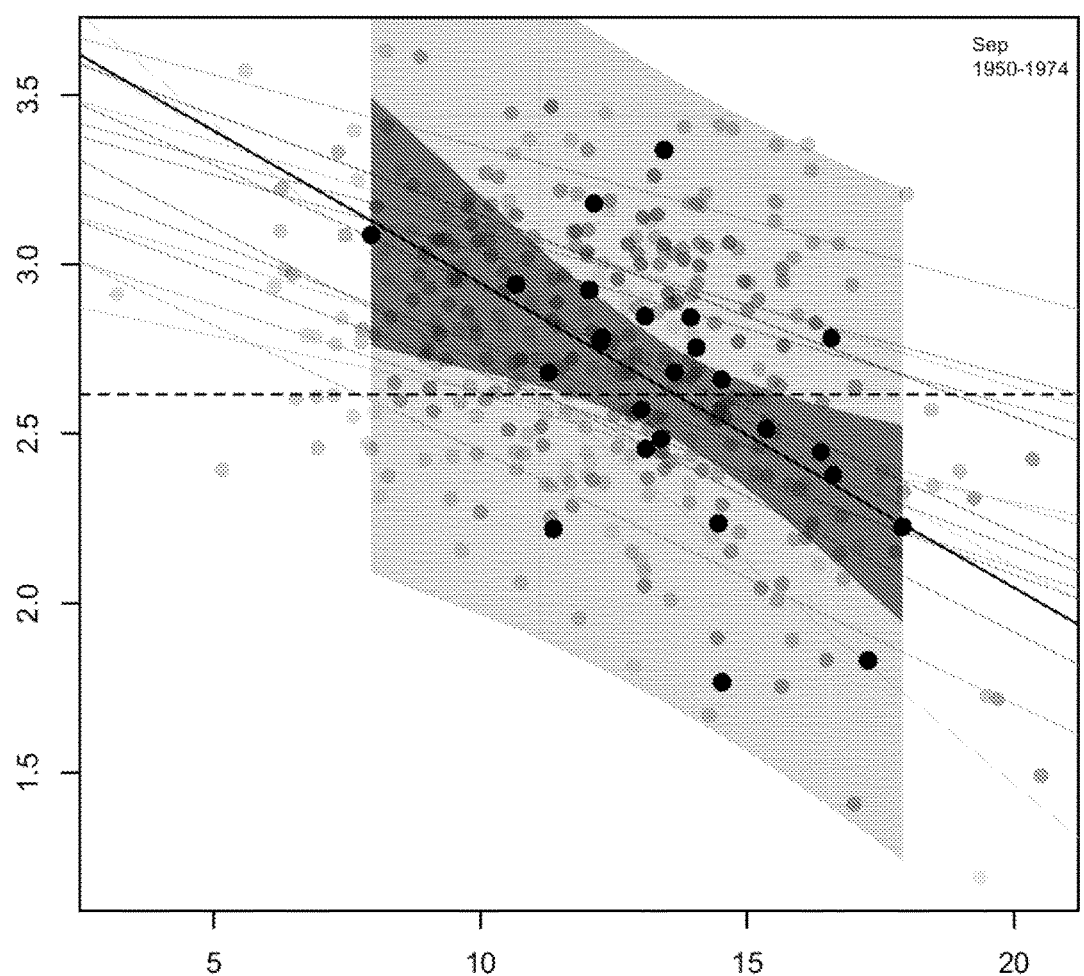
FIG. 5 is a graph illustrating observed and simulated temperature and precipitation maxima for each September from 1950-1974 and regression fits of the data from the present framework for a Missouri watershed region.

FIG. 5 depicts one month—September—for the years 1950-1974. (For clarity of depicting the data in FIGS. 5, 6, and 7, only a single month is shown; it will be appreciated that similar graphs are generated for each month, January to December, for the same time period, 1950-1974.) Each point is same day temperature (X-axis) and precipitation maxima (Y-axis) from this time period, 1950-1974. Larger black dots are observations, and black shading represents 95% regression confidence bounds, and the more opaque black shading represents 95% prediction intervals. The other smaller dots represent statistics of GCMs and corresponding lines are their regression fits. (For the statistics and regression fits, it will be appreciated that each GCM can be depicted with, for example, a particular color or symbol to distinguish from the other GCMs.) This depiction makes the goal of the Bayesian model visual, to provide a posterior that captures the prediction interval (the most opaque bounds) reliably for the current regime and uses those weights for the future climatological regime.

Figure 6:
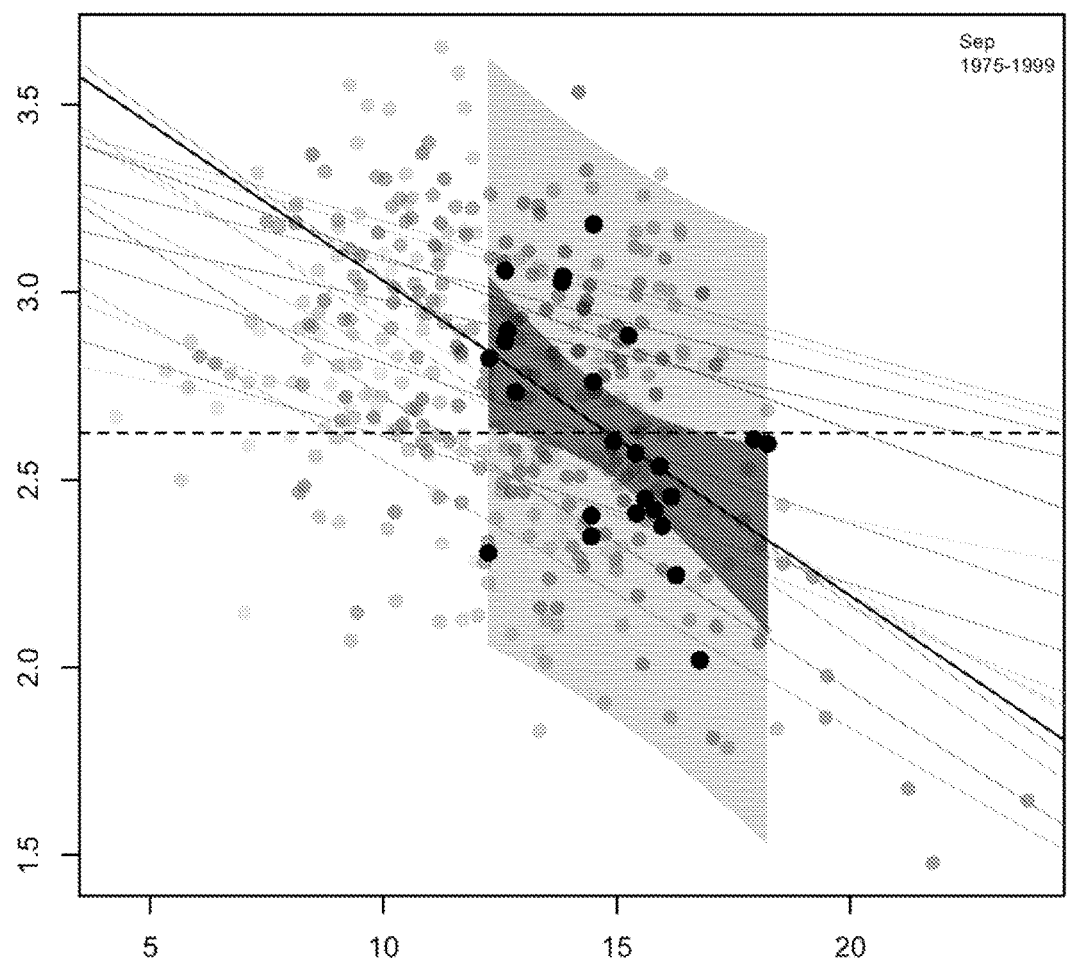
FIG. 6 is a graph illustrating observed and simulated temperature and precipitation maxima from 1975-1999 as a holdout period for the Missouri watershed region.

FIG. 6 is similar to FIG. 5, but for the month of September for the years 1975-1999. This time period is used as a "holdout" a regime for which observations exist, but where the Bayesian model is not actually including them in finding posterior distributions for the random parameters. It can be seen from this time period that a lot of the biases and patterns are the same over different time regimes, lending some confidence that if the system can learn a set of weights that work well in one time period, they should work well later. There are no guarantees given non-stationarity, long lead times, and possible non-linearities when predictions are made much further out into the future.

Figure 7:
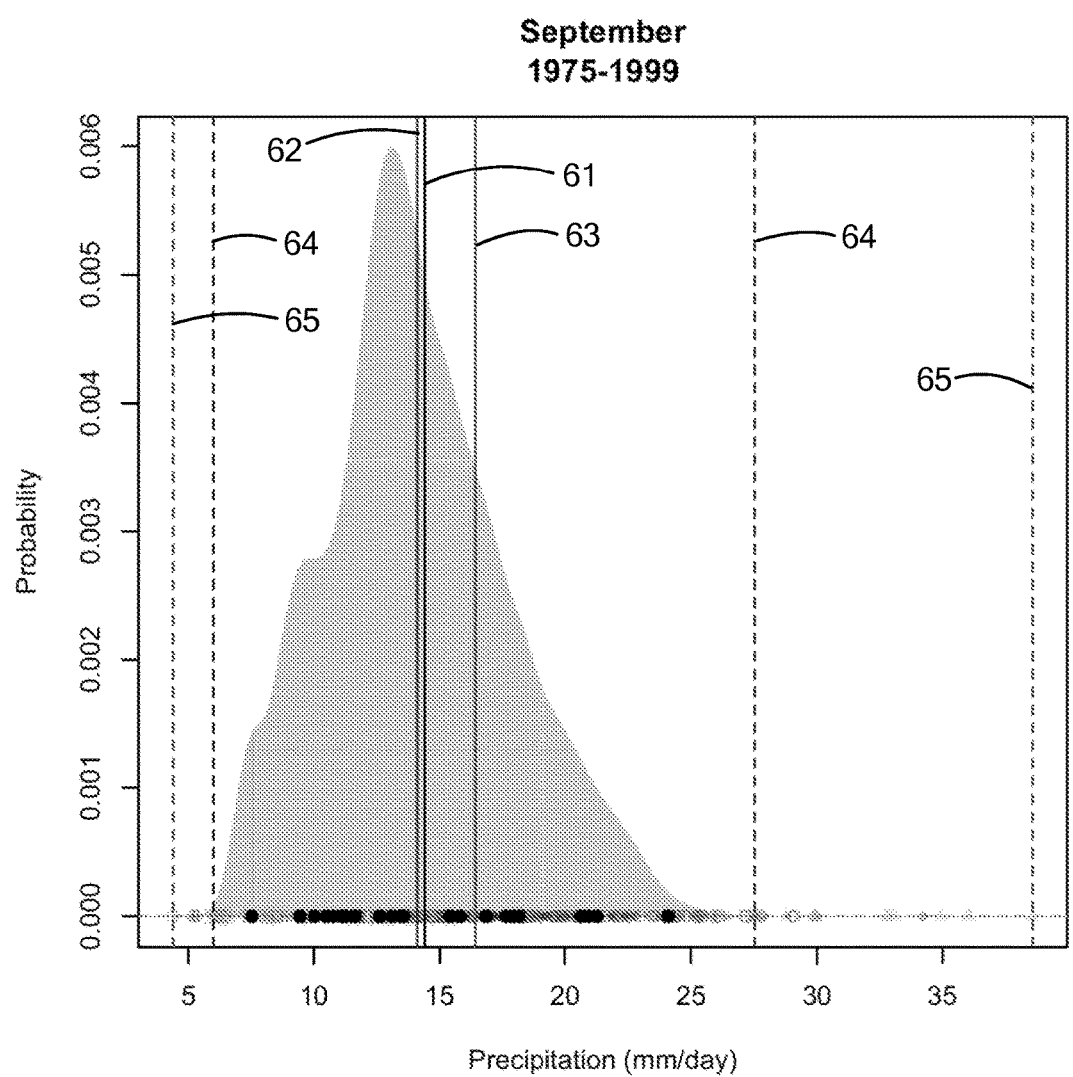
FIG. 7 is a graph illustrating projected distribution of extremes for September 1975-1999 for the Missouri watershed region.

FIG. 7 illustrates the projected distribution of extremes for September 1975-1999 as a full probability distribution. The solid black dots are actual observations. The other symbols (each representing a different model simulation) are the original projections from the 16 climate models. The probability distribution is the output from the Bayesian framework. The solid vertical line 61 is the average of the observed values, the solid line 62 is the same but for our probability distribution, and the solid line 63 is the same but for the average of the original climate model simulations. The dashed lines 64 are 99.9% prediction bounds for the Bayesian outputs (that is, 99.9% of the values from the model fall between these two dashed lines). The dashed lines 65 are the minimum and maximum values as obtained from the full set of original climate model outputs. FIGS. 10-11 attempt to quantify this enhanced performance: FIGS. 10A and 10B show that the posterior mean values of extremes are usually better in terms of error performance compared to the held out observations; FIG. 11 shows that the posterior uncertainty intervals are significantly more "precise" (less wide) than using the original, raw GCM forecast bounds implying that the present Bayesian model can be useful for uncertainty reduction.

Figure 8:
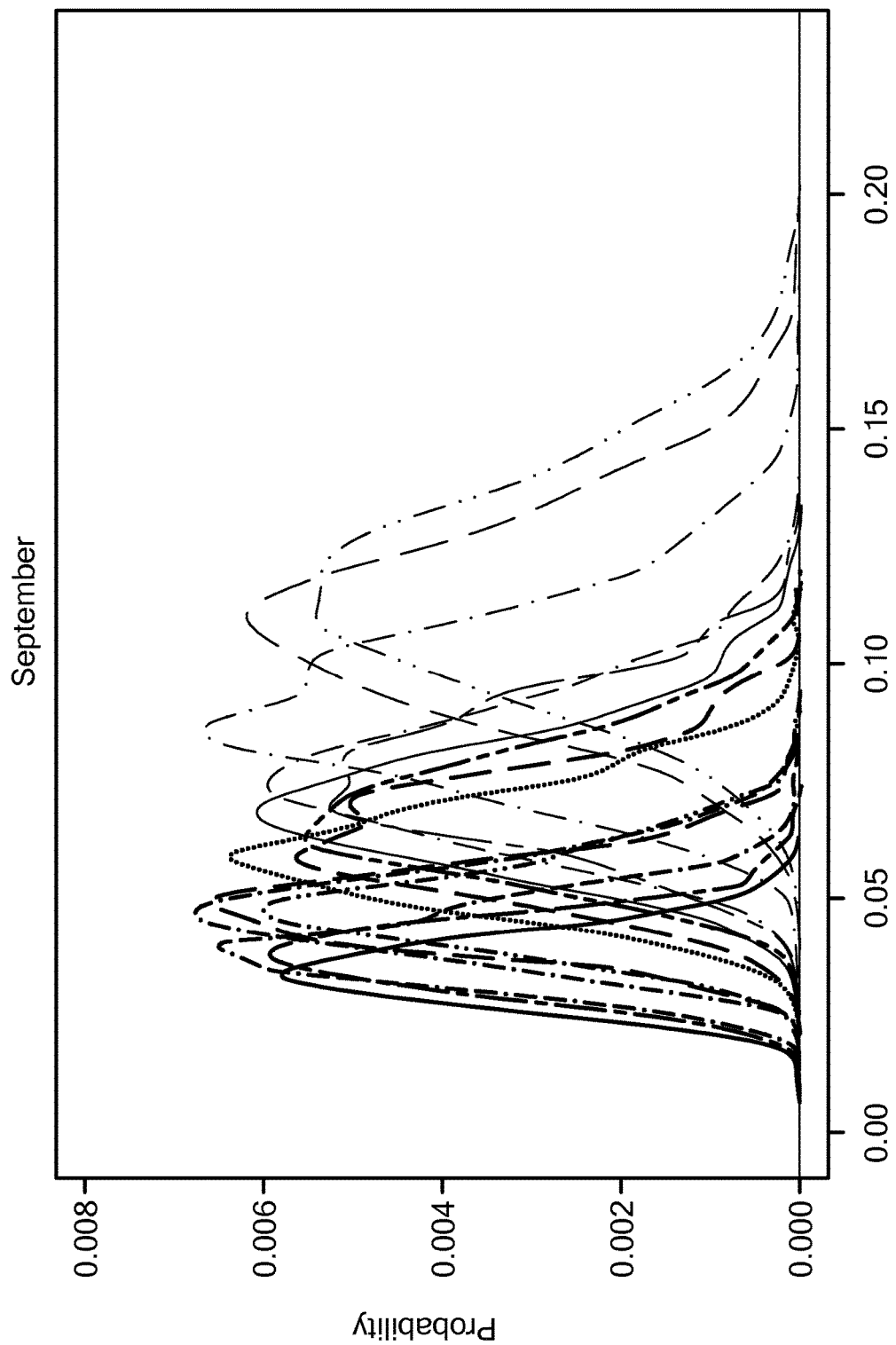
FIG. 8 is a graph illustrating posterior distributions for weights for each climate model for the Missouri watershed region.

FIG. 8 illustrates posterior distributions for the weights, $\varepsilon_{j,m}$, normalized to add up to 1 over each Markov Chain Monte Carlo (MCMC) iteration. This can be a useful diagnostic to understand how "reliable" each GCM's output is and hence how it was weighted in the MCMC routine. Each distribution curve can be depicted using a same color or symbol to map to FIGS. 5-7.

Figure 9A:
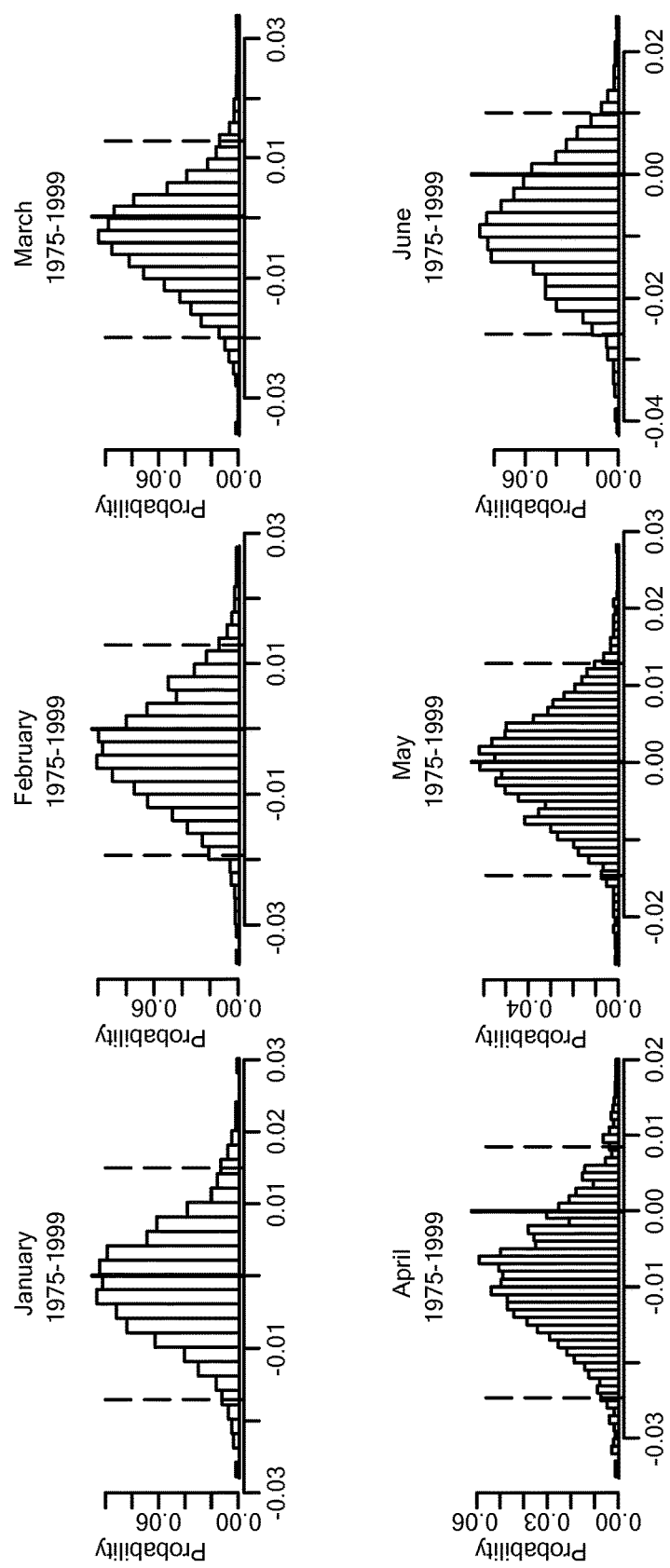
FIGS. 9A and 9B are graphs illustrating posterior distributions for all months between 1975 and 1999 of a variance of precipitation extremes with temperature for the Missouri watershed region.
Figure 9B:
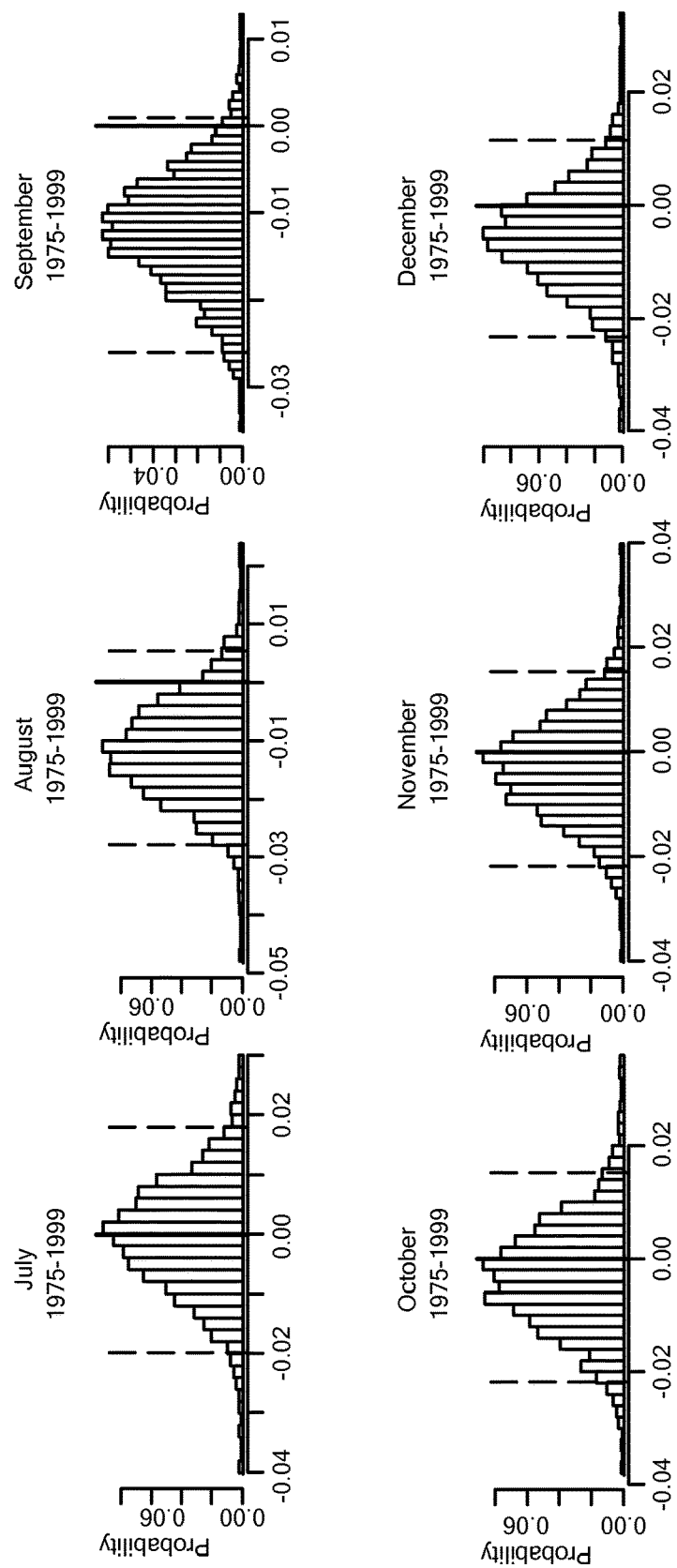

FIG. 9 illustrates, for all months from 1975-1999, posterior distributions for $\phi_m'$, which can serve to quantify the inferred true relationship (direction and magnitude) between temperature and precipitation extremes and the uncertainty in that relationship. The black vertical line is positioned at 0, and the shaded vertical lines are the 99% posterior interval. For instance, see September: here the bounds almost exclude 0, meaning (roughly) that the true value $\phi_m'=9$ is inferred to be (almost) statistically less than 0, at a level of 0.01. This is a reflection of a mixture of both the GCMs and the observational data (e.g., see the linear regression lines in FIGS. 5 and 6.

In FIG. 10A, extremes are averaged each quantile and month, for the posterior distribution and then the equal weighted average over the original GCMs forecasts. Then the root mean squared error (RMSE) is computed over all those combinations (25 quantiles (q)×12 months (m), so an RMSE is computed over all 300 combinations) with held out observations as the reference set. This is done for each of the 18 watersheds. This is done for the Bayesian posterior averages and then for the multimodel ensemble (MME) average. Then the ratio of those 2 RMSEs is taken. With two exceptions on the west coast, the present model outperforms the MME mean. (Smaller RMSE is better.)

FIG. 10B is the same as FIG. 10A, but only for q'=25 year precipitation extremes events. The Bayesian model performs better, according to this measure, for 14 of the 18 watersheds.

Referring to FIG. 11, the width of the full Bayesian posterior distribution of $\mathbb{C}_{m,q'}$ is computed for each month, and then averaged all 12 months, for the holdout time region (1975-1999). The same is computed for the full collection of GCMs (the multimodel ensemble, or MME), which is the maximum data point minus the minimum data point in that collection, over all 12 months. The ratio of these two is computed for each watershed. The Bayesian model gives a narrower distribution of precipitation extremes in 14 of the 18 watersheds. The notable exception is the red "Lower Mississippi" region, where the Bayesian model projects with much larger uncertainty—which is ultimately an artifact of its sensitivity to several extreme outliers in the original GCM projections. This can ultimately be mitigated with the prior parameters, $\rho_{0,m}$ and $\rho_{0,m}$, which can help constrain the distribution of $\chi_m$ (which is, in this case, prescribing an overly extreme amount of uncertainty, very specifically, in October precipitation extremes, based on a few huge GCM outlying data points over the 1975-1999 period).

The system and method can provide a number of advantages, depending on the embodiment. For example, interconnections between multiple climate variables (such as temperature, rainfall, and wind) can be considered by blending a variety of publicly available climate models and observed datasets. Adaptive metrics can be provided for prediction and uncertainty in stakeholder metrics, like IDF curves, for long lead times into the future. Metrics for evaluating the quality and reliability of climate models can be included that may be useful to the climate modeling scientific community. The system and method can be used at various geospatial and temporal scales to meet stakeholder-specific location and time of event needs. The system and method can provide a commercial framework that provides for an improvement in regional and local spatial scale prediction of an uncertainty in extreme weather events and other crucial stakeholder metrics, such as hydrological indicators and Intensity-Duration-Frequency (IDF) curves. The best possible predictions and uncertainties can be provided based on the most up to date datasets, unlike current indicators and IDF curves, which are often based on old data and do not consider shifts in global, regional, and local climate conditions. The system and method are adaptive and automated, such that a user can query updated predictions and uncertainty bounds that will adjust depending on new observed data and climate models.

It will be appreciated that the various features of the embodiments described herein can be combined in a variety of ways. For example, a feature described in conjunction with one embodiment may be included in another embodiment even if not explicitly described in conjunction with that embodiment.

The present invention has been described with reference to the preferred embodiments. It is to be understood that the invention is not limited to the exact details of construction, operation, exact materials or embodiments shown and described, as obvious modifications and equivalents will be apparent to one skilled in the art. It is believed that many modifications and alterations to the embodiments disclosed will readily suggest themselves to those skilled in the art upon reading and understanding the detailed description of the invention. It is intended to include all such modifications and alterations insofar as they come within the scope of the present invention.

What is claimed is:

1. A system for providing multivariate climate change forecasting comprising:
   one or more processors and memory, and machine-readable instructions stored in the memory that, upon execution by the one or more processors cause the system to carry out operations comprising:
   obtaining, from one or more climate model datasets, climate model data comprising simulated historical climate model data used in one or more climate models and simulated future climate model data from the one or more climate models;
   obtaining, from one or more climate observational datasets, observational data comprising historical observed climate data;
   providing a statistical distribution of extremes or climate indices for one or more variable climate features using the climate model data and the observational model data, comprising:
      sorting the climate model data and the observational climate data by numeric magnitude of extreme events or climate indices to obtain rankings,
      statistically comparing rankings of the climate model data from a least some of the climate models to the rankings of the observational climate data to derive weights for each climate model simulation, and
      from the weights, deriving a distribution of extreme events or climate indices over a determined time period;
   determining one or more metrics from the variable climate features, each of the metrics comprising:
      a prediction of a future climate variable for a determined future time period,
      a confidence bound of the prediction of the future climate variable for the determined future time period, and
      a prediction bound for the future climate variable for the determined future time period; and
   outputting the one or more metrics to an output device.

2. The system of claim 1, wherein the variable climate features include one or more of precipitation, precipitation extremes, temperature, wind direction, wind speed, sea surface temperature, convective available potential energy, soil moisture, crop moisture, droughts, hurricanes, heatwaves, cold snaps, tornadoes, heating degree days, cooling degree days, heatwave intensity, or coldwave intensity.

3. The system of claim 1, wherein the climate indices include indices representing heating degree days, cooling degree days, soil moisture, precipitation, crop moisture, heatwave intensity, or coldwave intensity.

4. The system of claim 1, further comprising determining a climate model weight for each of the one or more climate models from which the climate model data were obtained.

5. The system of claim 1, wherein the step of providing a statistical distribution of extremes or climate indices comprises estimating framework parameters using the simulated historical climate model data and the simulated future climate model data over historical and future time periods, the parameters comprising descriptions of the variable climate features and dependences among the variable climate features.

6. The system of claim 1, wherein the step of providing a statistical distribution of extremes or climate indices comprises:
   using the climate model data and the observational climate data to obtain a distribution for each climate variable, the distribution described by a set of random unknown parameters,
   providing a prior distribution for each of the random unknown parameters;
   deriving posterior distributions using a Bayesian model.

7. The system of claim 1, wherein in the step of providing a statistical distribution of extremes of climate indices, the distribution is simulated using a Markov Chain Monte Carlo computational engine.

8. The system of claim 1, wherein the determined future time period comprises a monthly time period, a seasonal time period, an annual time period, or a multi-annual time period.

9. The system of claim 1, wherein the metrics are determined globally or for a specified geographic region.

10. The system of claim 1, wherein the metrics include one or more of a future distribution of precipitation, precipitation extremes, temperature, wind direction, wind speed, sea surface temperature, convective available potential energy, soil moisture, crop moisture, droughts, hurricanes, heatwaves, cold snaps, tornadoes, heating degree days, cooling degree days, heatwave intensity, or coldwave intensity for a specified geographic region, or one or more of bias parameters for any one of the climate model simulations.

11. The system of claim 1, further comprising determining from the metrics a precipitation intensity-duration-frequency curve and outputting the precipitation intensity-duration-frequency curve to the output device.

12. The system of claim 1, further comprising determining from the metrics precipitation extremes projections and estimating changes in rainfall events expected to be exceeded only once on average in the determined future time period.

13. The system of claim 1, further comprising determining from the metrics probable maximum precipitation ratios for the determined future time period and an evolution of the probable maximum precipitation ratios over time.

14. The system of claim 1, further comprising determining from the metrics probable maximum ratios for one or more of precipitation, temperature, wind direction, wind speed, sea surface temperature, convective available potential energy, soil moisture, crop moisture, droughts, hurricanes, heatwaves, cold snaps, tornadoes, heating degree days, cooling degree days, heatwave intensity, and coldwave intensity for a determined future time period and an evolution of the probable maximum ratio over time.

15. The system of claim 1, further comprising determining from the metrics one or more of temperature change projections for a specified geographic region and precipitation extremes change projections for a specified geographic region.

16. The system of claim 1, further comprising determining from the metrics projections of changes in one or more of precipitation, temperature, wind direction, wind speed, sea surface temperature, convective available potential energy, soil moisture, crop moisture, droughts, hurricanes, heatwaves, cold snaps, tornadoes, heating degree days, cooling degree days, heatwave intensity, and coldwave intensity for a specified geographic region.

17. The system of claim 1, further comprising determining from the metrics climate model skill diagnostics.

18. The system of claim 1, wherein the output device comprises a computer, a personal computer, a workstation, a server, a laptop computer, a tablet computer, a mobile telephone, a mobile computing device, a monitor, a video display device, a printer.

19. A method for providing multivariate climate change forecasting comprising:

receiving, at a computer comprising one or more processors and memory, from one or more climate model datasets, climate model data comprising simulated historical climate model data used in one or more climate models and simulated future climate model data from the one or more climate models;

receiving, at the computer, from one or more climate observational datasets, observational data comprising historical observed climate data;

providing a statistical distribution of extremes or climate indices for one or more variable climate features using the climate model data and the observational model data, comprising:

sorting the climate model data and the observational climate data by numeric magnitude of extreme events or climate indices to obtain rankings, statistically comparing rankings of the climate model data from a least some of the climate models to the rankings of the observational climate data to derive weights for each climate model simulation, and from the weights, deriving a distribution of extreme events or climate indices over a determined time period;

determining one or more metrics from the variable climate features, each of the metrics comprising:

a prediction of a future climate variable for a determined future time period, a confidence bound of the prediction of the future climate variable for the determined future time period, and a prediction bound for the future climate variable for the determined future time period; and outputting the one or more metrics to an output device.

20. A system for providing multivariate climate change forecasting comprising:

one or more processors and memory, and machine-readable instructions stored in the memory that, upon execution by the one or more processors cause the system to carry out operations comprising:

obtaining, from one or more climate model datasets, climate model data comprising simulated historical climate model data used in one or more climate models and simulated future climate model data from the one or more climate models;

obtaining, from one or more climate observational datasets, observational data comprising historical observed climate data;

providing a statistical distribution of extremes or climate indices for one or more variable climate features using the climate model data and the observational model data, comprising:

using the climate model data and the observational climate data to obtain a distribution for each climate variable, the distribution described by a set of random unknown parameters, providing a prior distribution for each of the random unknown parameters;

deriving posterior distributions using a Bayesian model;

determining one or more metrics from the variable climate features, each of the metrics comprising:

a prediction of a future climate variable for a determined future time period, a confidence bound of the prediction of the future climate variable for the determined future time period, and a prediction bound for the future climate variable for the determined future time period; and outputting the one or more metrics to an output device.

21. The system of claim 20, wherein the variable climate features include one or more of precipitation, precipitation extremes, temperature, wind direction, wind speed, sea surface temperature, convective available potential energy, soil moisture, crop moisture, droughts, hurricanes, heatwaves, cold snaps, tornadoes, heating degree days, cooling degree days, heatwave intensity, or coldwave intensity.

22. The system of claim 20, wherein the climate indices include indices representing heating degree days, cooling degree days, soil moisture, precipitation, crop moisture, heatwave intensity, or coldwave intensity.

23. The system of claim 20, further comprising determining a climate model weight for each of the one or more climate models from which the climate model data were obtained.

24. The system of claim 20, wherein the step of providing a statistical distribution of extremes or climate indices comprises estimating framework parameters using the simulated historical climate model data and the simulated future climate model data over historical and future time periods, the parameters comprising descriptions of the variable climate features and dependences among the variable climate features.

25. The system of claim 20, wherein in the step of providing a statistical distribution of extremes of climate indices, the distribution is simulated using a Markov Chain Monte Carlo computational engine.

26. The system of claim 20, wherein the determined future time period comprises a monthly time period, a seasonal time period, an annual time period, or a multi-annual time period.

27. The system of claim 20, wherein the metrics are determined globally or for a specified geographic region.

28. The system of claim 20, wherein the metrics include one or more of a future distribution of precipitation, precipitation extremes, temperature, wind direction, wind speed, sea surface temperature, convective available potential energy, soil moisture, crop moisture, droughts, hurricanes, heatwaves, cold snaps, tornadoes, heating degree days, cooling degree days, heatwave intensity, or coldwave intensity for a specified geographic region, or one or more of bias parameters for any one of the climate model simulations.

29. The system of claim 20, further comprising determining from the metrics a precipitation intensity-duration-frequency curve and outputting the precipitation intensity-duration-frequency curve to the output device.

30. The system of claim 20, further comprising determining from the metrics precipitation extremes projections and estimating changes in rainfall events expected to be exceeded only once on average in the determined future time period.

31. The system of claim 20, further comprising determining from the metrics probable maximum precipitation ratios for the determined future time period and an evolution of the probable maximum precipitation ratios over time.

32. The system of claim 20, further comprising determining from the metrics probable maximum ratios for one or more of precipitation, temperature, wind direction, wind speed, sea surface temperature, convective available potential energy, soil moisture, crop moisture, droughts, hurricanes, heatwaves, cold snaps, tornadoes, heating degree days, cooling degree days, heatwave intensity, and coldwave intensity for a determined future time period and an evolution of the probable maximum ratio over time.

33. The system of claim 20, further comprising determining from the metrics one or more of temperature change projections for a specified geographic region and precipitation extremes change projections for a specified geographic region.

34. The system of claim 20, further comprising determining from the metrics projections of changes in one or more of precipitation, temperature, wind direction, wind speed, sea surface temperature, convective available potential energy, soil moisture, crop moisture, droughts, hurricanes, heatwaves, cold snaps, tornadoes, heating degree days, cooling degree days, heatwave intensity, and coldwave intensity for a specified geographic region.

35. The system of claim 20, further comprising determining from the metrics climate model skill diagnostics.

36. The system of claim 20, wherein the output device comprises a computer, a personal computer, a workstation, a server, a laptop computer, a tablet computer, a mobile telephone, a mobile computing device, a monitor, a video display device, a printer.

37. A method for providing multivariate climate change forecasting comprising:
  receiving, at a computer comprising one or more processors and memory, from one or more climate model datasets, climate model data comprising simulated historical climate model data used in one or more climate models and simulated future climate model data from the one or more climate models;
  receiving, at the computer, from one or more climate observational datasets, observational data comprising historical observed climate data;
  providing a statistical distribution of extremes or climate indices for one or more variable climate features using the climate model data and the observational model data, comprising:
    using the climate model data and the observational climate data to obtain a distribution for each climate variable, the distribution described by a set of random unknown parameters,
    providing a prior distribution for each of the random unknown parameters;
    deriving posterior distributions using a Bayesian model;
  determining one or more metrics from the variable climate features, each of the metrics comprising:
    a prediction of a future climate variable for a determined future time period,
    a confidence bound of the prediction of the future climate variable for the determined future time period, and
    a prediction bound for the future climate variable for the determined future time period; and
  outputting the one or more metrics to an output device.

38. A system for providing multivariate climate change forecasting comprising:
  one or more processors and memory, and machine-readable instructions stored in the memory that, upon execution by the one or more processors cause the system to carry out operations comprising:
    obtaining, from one or more climate model datasets, climate model data comprising simulated historical climate model data used in one or more climate models and simulated future climate model data from the one or more climate models;
    obtaining, from one or more climate observational datasets, observational data comprising historical observed climate data;
    providing a statistical distribution of extremes or climate indices for one or more variable climate features using the climate model data and the observational model data, wherein the distribution is simulated using a Markov Chain Monte Carlo computational engine;
    determining one or more metrics from the variable climate features, each of the metrics comprising:
      a prediction of a future climate variable for a determined future time period,
      a confidence bound of the prediction of the future climate variable for the determined future time period, and
      a prediction bound for the future climate variable for the determined future time period; and
    outputting the one or more metrics to an output device.

39. The system of claim 38, wherein the variable climate features include one or more of precipitation, precipitation extremes, temperature, wind direction, wind speed, sea surface temperature, convective available potential energy, soil moisture, crop moisture, droughts, hurricanes, heatwaves, cold snaps, tornadoes, heating degree days, cooling degree days, heatwave intensity, or coldwave intensity.

40. The system of claim 38, wherein the climate indices include indices representing heating degree days, cooling degree days, soil moisture, precipitation, crop moisture, heatwave intensity, or coldwave intensity.

41. The system of claim 38, further comprising determining a climate model weight for each of the one or more climate models from which the climate model data were obtained.

42. The system of claim 38, wherein the step of providing a statistical distribution of extremes or climate indices comprises estimating framework parameters using the simulated historical climate model data and the simulated future climate model data over historical and future time periods, the parameters comprising descriptions of the variable climate features and dependences among the variable climate features.

43. The system of claim 38, wherein the determined future time period comprises a monthly time period, a seasonal time period, an annual time period, or a multi-annual time period.

44. The system of claim 38, wherein the metrics are determined globally or for a specified geographic region.

45. The system of claim 38, wherein the metrics include one or more of a future distribution of precipitation, precipitation extremes, temperature, wind direction, wind speed, sea surface temperature, convective available potential energy, soil moisture, crop moisture, droughts, hurricanes, heatwaves, cold snaps, tornadoes, heating degree days, cooling degree days, heatwave intensity, or coldwave intensity for a specified geographic region, or one or more of bias parameters for any one of the climate model simulations.

46. The system of claim 38, further comprising determining from the metrics a precipitation intensity-duration-frequency curve and outputting the precipitation intensity-duration-frequency curve to the output device.

47. The system of claim 38, further comprising determining from the metrics precipitation extremes projections and estimating changes in rainfall events expected to be exceeded only once on average in the determined future time period.

48. The system of claim 38, further comprising determining from the metrics probable maximum precipitation ratios for the determined future time period and an evolution of the probable maximum precipitation ratios over time.

49. The system of claim 38, further comprising determining from the metrics probable maximum ratios for one or more of precipitation, temperature, wind direction, wind speed, sea surface temperature, convective available potential energy, soil moisture, crop moisture, droughts, hurricanes, heatwaves, cold snaps, tornadoes, heating degree days, cooling degree days, heatwave intensity, and coldwave intensity for a determined future time period and an evolution of the probable maximum ratio over time.

50. The system of claim 38, further comprising determining from the metrics one or more of temperature change projections for a specified geographic region and precipitation extremes change projections for a specified geographic region.

51. The system of claim 38, further comprising determining from the metrics projections of changes in one or more of precipitation, temperature, wind direction, wind speed, sea surface temperature, convective available potential energy, soil moisture, crop moisture, droughts, hurricanes, heatwaves, cold snaps, tornadoes, heating degree days, cooling degree days, heatwave intensity, and coldwave intensity for a specified geographic region.

52. The system of claim 38, further comprising determining from the metrics climate model skill diagnostics.

53. The system of claim 38, wherein the output device comprises a computer, a personal computer, a workstation, a server, a laptop computer, a tablet computer, a mobile telephone, a mobile computing device, a monitor, a video display device, a printer.

54. A method for providing multivariate climate change forecasting comprising:
- receiving, at a computer comprising one or more processors and memory, from one or more climate model datasets, climate model data comprising simulated historical climate model data used in one or more climate models and simulated future climate model data from the one or more climate models;
- receiving, at the computer, from one or more climate observational datasets, observational data comprising historical observed climate data;
- providing a statistical distribution of extremes or climate indices for one or more variable climate features using the climate model data and the observational model data, wherein the distribution is simulated using a Markov Chain Monte Carlo computational engine;
- determining one or more metrics from the variable climate features, each of the metrics comprising:
  - a prediction of a future climate variable for a determined future time period,
  - a confidence bound of the prediction of the future climate variable for the determined future time period, and
  - a prediction bound for the future climate variable for the determined future time period; and
- outputting the one or more metrics to an output device.

* * * * *